(12) United States Patent
Shinano

(10) Patent No.: US 8,376,670 B2
(45) Date of Patent: Feb. 19, 2013

(54) SPINDLE HEAD DEVICE AND MACHINE TOOL

(75) Inventor: Keizo Shinano, Kodaira (JP)

(73) Assignee: Citizen Holdings Co., Ltd., Tokyo (JP)

( * ) Notice: Subject to any disclaimer, the term of this patent is extended or adjusted under 35 U.S.C. 154(b) by 1177 days.

(21) Appl. No.: 12/295,243

(22) PCT Filed: Mar. 29, 2007

(86) PCT No.: PCT/JP2007/057615
§ 371 (c)(1),
(2), (4) Date: Sep. 29, 2008

(87) PCT Pub. No.: WO2007/114483
PCT Pub. Date: Oct. 11, 2007

(65) Prior Publication Data
US 2009/0116924 A1 May 7, 2009

(30) Foreign Application Priority Data

Mar. 30, 2006 (JP) ................................ 2006-094347

(51) Int. Cl.
*B23Q 3/12* (2006.01)
(52) U.S. Cl. .................. 409/233; 409/231; 409/136
(58) Field of Classification Search .................. 409/231, 409/232, 233, 135, 136; *B23Q 3/12*
See application file for complete search history.

(56) References Cited

U.S. PATENT DOCUMENTS

| | | | |
|---|---|---|---|
| 7,165,302 B2 * | 1/2007 | Kikkawa et al. | 29/426.1 |
| 7,972,096 B2 * | 7/2011 | Kikkawa | 409/136 |
| 2005/0175425 A1 | 8/2005 | Watanabe et al. | |
| 2005/0196247 A1 * | 9/2005 | Dawidziak et al. | 409/233 |
| 2005/0220556 A1 * | 10/2005 | Takase et al. | 409/233 |
| 2008/0080943 A1 * | 4/2008 | Bernhard et al. | 409/233 |

FOREIGN PATENT DOCUMENTS

| | | |
|---|---|---|
| CN | 1654146 A | 8/2005 |
| DE | 24 24 593 | 10/1975 |
| DE | 4239769 A1 | 6/1994 |
| DE | 10317097 A1 | 11/2004 |
| JP | 5-220607 | 8/1993 |

(Continued)

OTHER PUBLICATIONS

European Search Report dated May 23, 2012 issued in Application No. 07741051.2.

*Primary Examiner* — Daniel Howell
*Assistant Examiner* — Justin Sikorski
(74) *Attorney, Agent, or Firm* — Finnegan, Henderson, Farabow, Garrett & Dunner, L.L.P.

(57) ABSTRACT

A spindle head device (10) includes a spindle (12) and a tool retaining mechanism (16) detachably retaining a tool holder (14) on the spindle. The tool retaining mechanism includes a tool support member (52) having a receiving recess (50) detachably receiving the shank (46) of the tool holder, a tool clamp member (54) disposed to be displaceable with respect to the tool support member between an operative position and an inoperative position, and a mounting member (56) detachably mounting the tool support member and the tool clamp member to the spindle. The tool clamp member grips the shank of the tool holder and fixedly holds the shank to the receiving recess of the tool support member at an operative position, and, at an inoperative position, releases the shank to allow the tool holder to be attached or detached to or from the receiving recess.

6 Claims, 15 Drawing Sheets

FOREIGN PATENT DOCUMENTS

| | | |
|---|---|---|
| JP | 9-314404 | 12/1997 |
| JP | 11-254204 | 9/1999 |
| JP | 2003-291045 | 10/2003 |
| JP | 2003300101 A * | 10/2003 |

* cited by examiner

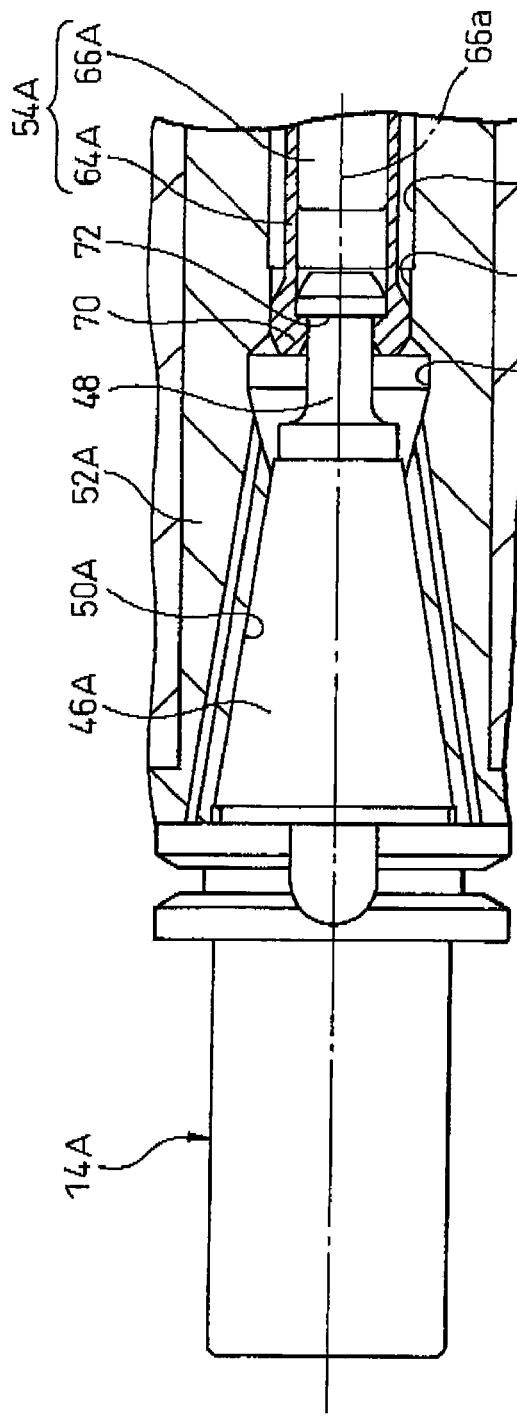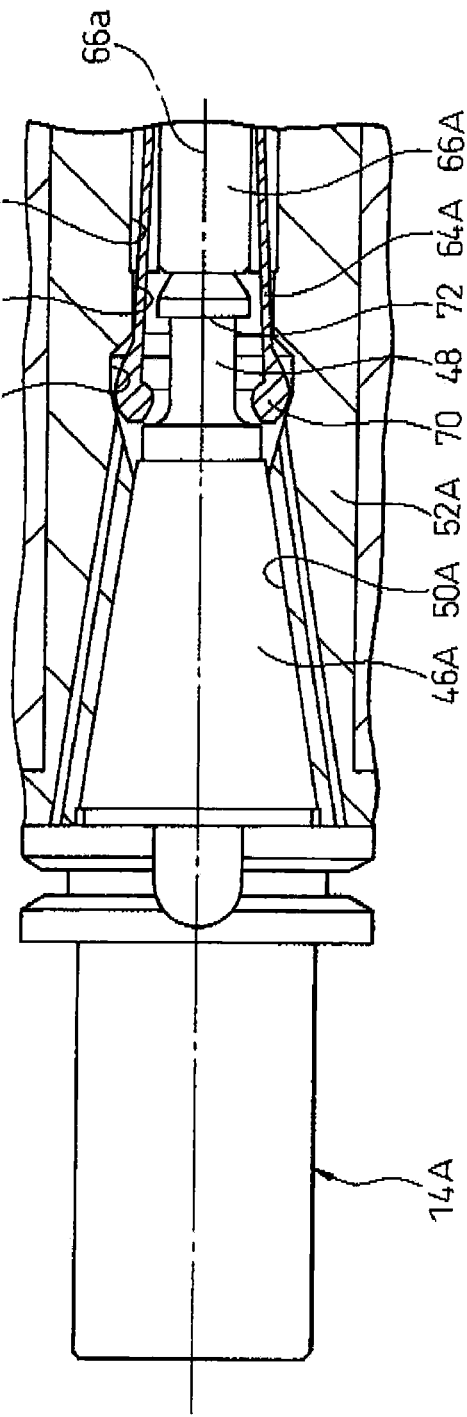
Fig.6A
Fig.6B

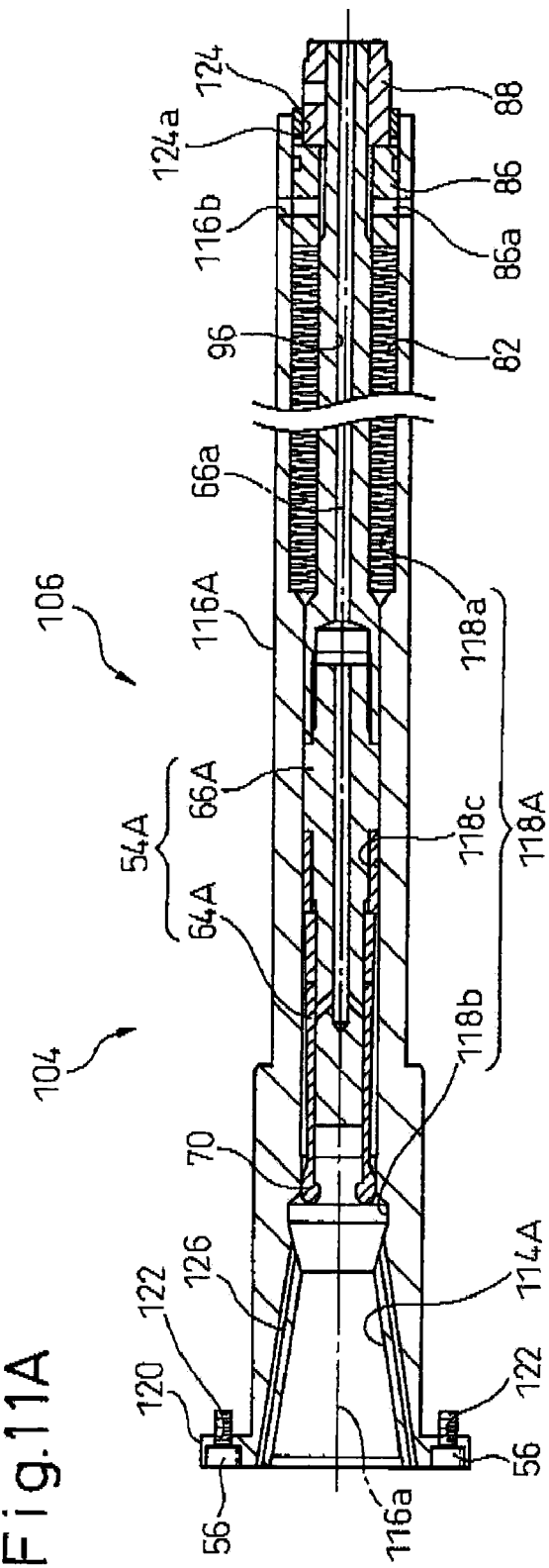
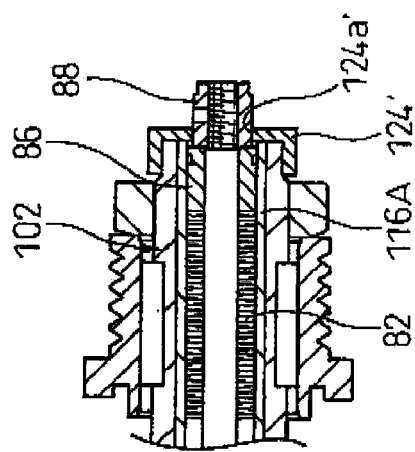
Fig.11A
Fig.11B

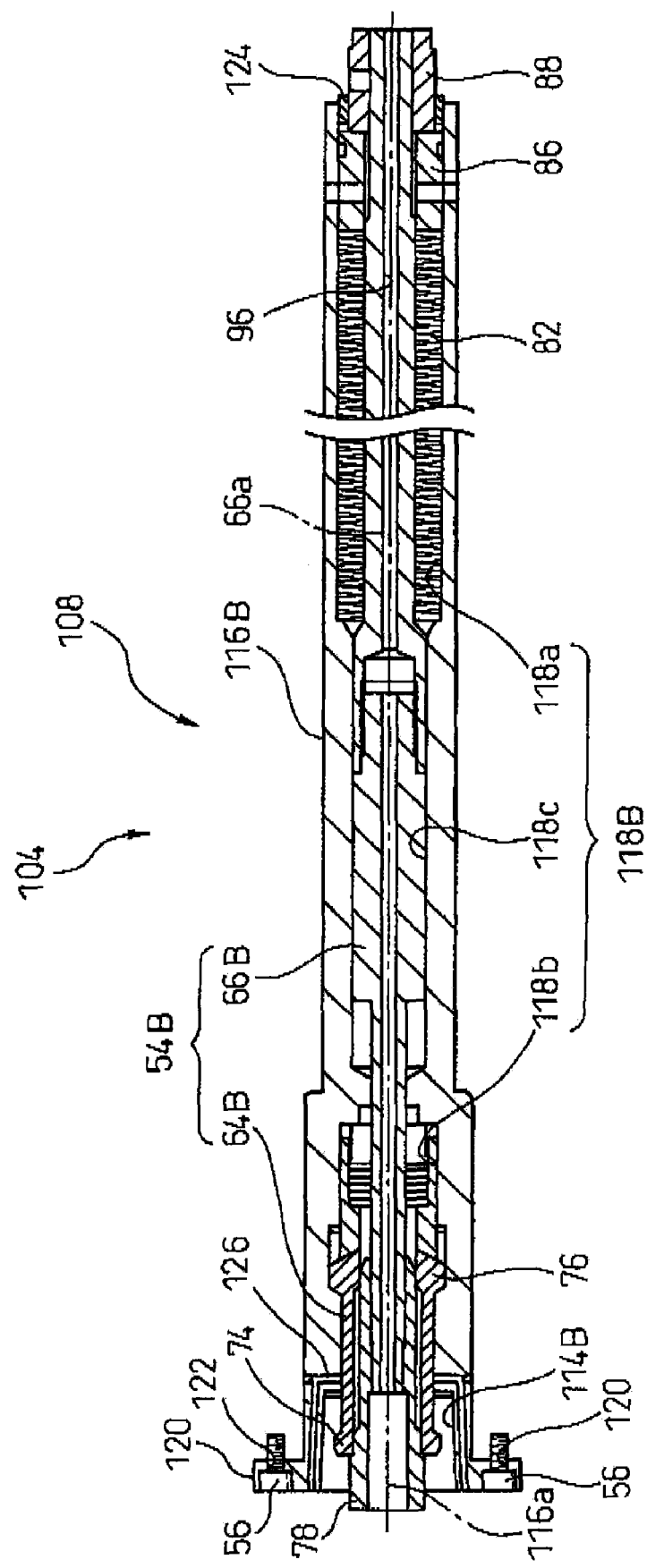

SPINDLE HEAD DEVICE AND MACHINE TOOL

TECHNICAL FIELD

The present invention relates to a spindle head device installed in a machine tool and including a tool spindle. The present invention also relates to a machine tool equipped with a spindle head device including a tool spindle.

BACKGROUND ART

A machine tool (e.g., a milling machine, a machining center, etc.) provided with a spindle (a, so-called tool spindle) for fixedly supporting a tool and rotating, is configured such that various cutting operations can be carried out by selecting a suitable tool from among several types of tools respectively fitted to tool holders and attaching it to an axial end of the spindle (hereinafter referred to as a spindle nose) in an exchangeable manner. To this end, generally, a machine tool is provided, inside a spindle head device including a tool spindle, with a tool retaining mechanism for detachably retaining respective tool holders on the spindle nose.

A tool holder is provided with a chuck for chucking a tool, a shank adapted to be received and held in the spindle nose, and a flange adapted to be grasped by an automatic tool changer (ATC) and usually provided between the chuck and the shank. Correspondingly, the spindle nose is provided with a receiving recess for detachably receiving the shank (also referred to as a tool shank) of the tool holder. On the other hand, the tool retaining mechanism includes a movable clamping element for releasably clamping the tool shank and an actuating element for displacing the movable clamping element between a shank releasing position and a shank clamping position, and is accommodated in an axial through-hole formed in the spindle. The actuating element of the tool retaining mechanism is driven by a drive mechanism (e.g., a hydraulic cylinder mechanism) provided outside the spindle head device, and acts to displace the movable clamping element in accordance with the axial displacement of the actuating element in the through-hole of the spindle.

In the machine tool as described above, the configuration of the shank of the tool holder and the corresponding configuration of the spindle nose of the spindle are standardized by standards such as JIS (Japan Industrial Standard), DIN (Deutsche Industrie Normen), JBS (Japan Bench Machine Tool Builders Association Standard), etc. For example, a tool shank standardized by JIS or JBS is configured to have an outer surface in the shape of a circular truncated cone (with 7/24 taper) and be provided with a rod-like element, referred to as a pull stud, fixed at the distal end of the tool shank, while a corresponding spindle nose is provided with a shank receiving recess having an inner surface in the shape of a circular truncated cone (with 7/24 taper) (JIS B6101, B6339; JBS 4001, 4002, etc.). On the other hand, a tool shank standardized by DIN is configured to be provided with a thin-wall, hollow tubular body having an outer surface in the shape of a circular truncated cone (with 1/10 taper), while a corresponding spindle nose is provided with a shank receiving recess having an inner surface in the shape of a circular truncated cone (with 1/10 taper) (DIN 69063-5, 69893-5, etc.).

A tool retaining mechanism for retaining a tool holder complying with JIS (JBS) on a spindle nose, is configured to clamp the pull stud at the distal end of the tool shank received in the shank receiving recess by a plurality of movable clamping elements provided to be disposed around the pull stud, in which the movable clamping elements are moved in a radial direction under the operation of the actuating element and thus are engaged with a shoulder surface of the pull stud from the outside thereof. In contrast, a tool retaining mechanism for retaining a tool holder complying with DIN on a spindle nose, is configured to clamp the tool shank received in the shank receiving recess by a plurality of movable clamping elements provided to be inserted into the hollow interior portion of the tool shank, in which the movable clamping elements are moved in a radial direction under the operation of the actuating element and thus are engaged with a shoulder surface of the tool shank from the inside thereof. In this connection, the configurations of the tool holder, the spindle nose and the tool retaining mechanism, complying with JIS (JBS), are described in, for example, Japanese Unexamined Patent Publication (Kokai) No. 9-314404 (JP-A-9-314404). The configurations of the tool holder, the spindle nose and the tool retaining mechanism, complying with DIN, are also described in, for example, Japanese Unexamined Patent Publication (Kokai) No. 5-220607 (JP-A-5-220607).

As described above, for a conventional machine tool provided with a tool spindle, there are several standards different in terms of mechanical structures and incompatible with each other, regarding the configurations of a tool holder, a spindle nose and a tool retaining mechanism. Thus, when a user of a machine tool intends to use different types of tool holders complying with incompatible standards, it is necessary for the user to prepare different types of machine tools provided respectively with spindle head devices for exclusive use, each spindle head device including a spindle and a tool retaining mechanism, complying with each standard. The user generally tends to store various types of tools in a state where they are attached to tool holders, so that in a case where, for example, the user intends to suitably select and use the mechanical configurations respectively complying with JIS and DIN while considering several requirements such as a machining precision, a tool life, an operating noise, etc., it is also necessary to permanently prepare machine tools respectively complying with JIS and DIN, even for the same type of tools. Therefore, in this case, equipment cost may increase, and maintenance and management may be complicated.

A conventional machine tool provided with a tool spindle is also configured such that, in each standard, a shank of a tool holder is received and retained in a shank receiving recess at a spindle nose. Therefore, repeated tool-changing works may cause a wear of the shank receiving recess of the spindle nose, and in such a case, the spindle needs to be replaced with new one. In this connection, the spindle is usually required to be machined in high precision at the inner surface thereof including the shank receiving recess and the outer surface thereof adapted to be fitted into a bearing unit, and in recent years, there is an increasing requirement of forming a fluid passage for supplying cleaning fluid or cooling fluid so as to penetrate through the spindle, so that the spindle has now become relatively expensive among all components of a machine tool. Therefore, if the tool-changing is frequently carried out, the replacement of such an expensive spindle with new one may result higher maintenance costs.

DISCLOSURE OF THE INVENTION

It is an object of the present invention to provide a spindle head device installed in a machine tool, which is a multipurpose type capable of stably retaining, in an exchangeable manner, several types of tool holders provided with shanks mutually different in terms of mechanical structures, on a common spindle by tool retaining mechanisms corresponding respectively to the tool holders, and thus capable of preventing equipment cost from increasing and maintenance and management from becoming complicated.

It is another object of the present invention to provide a spindle head device installed in a machine tool, which can eliminate the need of replacing or renewal of a spindle even when a shank receiving recess for receiving a shank of a tool holder is worn, and thus can prevent maintenance cost from increasing.

It is still another object of the present invention to provide a general-purpose machine tool which includes a spindle head device capable of stably retaining, in an exchangeable manner, several types of tool holders provided with shanks mutually different in terms of mechanical structures, on a common spindle by tool retaining mechanisms corresponding respectively to the tool holders, and which can thereby prevent equipment cost from increasing and maintenance and management from becoming complicated.

It is a still further object of the present invention to provide a machine tool which can eliminate the need of replacing or renewal of a spindle even when a shank receiving recess provided in a spindle head device for receiving a shank of a tool holder is worn, and thus can prevent maintenance cost from increasing.

In order to accomplish the above objects, the present invention provides a spindle head device for a machine tool comprising a spindle; and a tool retaining mechanism detachably retaining a tool holder on the spindle; the tool retaining mechanism comprising: a tool support member provided with a receiving recess detachably receiving a shank of a tool holder; a tool clamp member disposed to be displaceable with respect to the tool support member between an operative position and an inoperative position, the tool clamp member, at the operative position, clamping the shank of the tool holder and fixedly holding the shank in the receiving recess of the tool support member, and at the inoperative position, releasing the shank and allowing the tool holder to be attached and detached to and from the receiving recess; and a mounting member detachably mounting the tool support member and the tool clamp member to the spindle.

In the above spindle head device, the spindle may be provided with a spindle-through-hole penetrating in an axial direction; the tool support member may be provided with a member-through-hole penetrating in an axial direction and communicating with the receiving recess, and may be dimensioned so as to be contained in one portion of the spindle-through-hole adjacently to one axial end of the spindle; and the tool clamp member may comprise a movable clamping element contained in the member-through-hole of the tool support member to be displaceable in a radial direction, and an actuating element contained in another portion of the spindle-through-hole defined between another axial end of the spindle and the tool support member to be displaceable in an axial direction, the actuating element displacing the movable clamping element in the radial direction by an axial displacement of the actuating element.

Alternatively, the spindle may be provided with a spindle-through-hole penetrating in an axial direction; the tool support member may be provided with a member-through-hole penetrating in an axial direction and communicating with the receiving recess, and may be dimensioned so as to be contained in the spindle-through-hole of the spindle over an entire axial length of the spindle-through-hole; and the tool clamp member may comprise a movable clamping element contained in the member-through-hole of the tool support member to be displaceable in a radial direction, and an actuating element contained in the member-through-hole of the tool support member to be displaceable in an axial direction, the actuating element displacing the movable clamping element in the radial direction by an axial displacement of the actuating element.

The spindle may be provided, in a region adjacent to one axial end of the spindle-through-hole, with a fitting surface having a tapered shape with a diameter thereof increasing toward the one axial end, the fitting surface acting to support in a centering manner the tool support member.

The tool support member may be provided with a fluid passage for supplying a cleaning fluid or a cooling fluid to a tool holder.

The tool retaining mechanism may comprise, in a mutually interchangeable manner, a first unit including a first one of the tool support member provided with a first one of the receiving recess and a first one of the tool clamp member carrying out a first displacement motion between the operative position and the inoperative position; and a second unit including a second one of the tool support member provided with a second one of the receiving recess, different in shape from the first one of receiving recess, and a second one of the tool clamp member carrying out a second displacement motion, different from the first displacement motion, between the operative position and the inoperative position.

The present invention further provides a machine tool comprising a spindle head device having the above-described configuration.

BRIEF DESCRIPTION OF THE DRAWINGS

The above and other objects, features and advantages of the present invention will become more apparent from the following description of preferred embodiments in connection with the accompanying drawings, in which:

FIGS. 6A and 6B are partial enlarged sectional views explaining tool-shank clamping/releasing operations performed for the first tool holder by a tool clamp member of the tool retaining mechanism in the spindle head device of FIG. 1, and showing respective states at an operative position and an inoperative position;

FIG. 11A is a sectional view showing, in the spindle head device of FIG. 8, a first unit of the tool retaining mechanism for retaining a first tool holder on the spindle;

FIG. 11B is a sectional view showing a modification of a locking member in the spindle head device of FIG. 8;

FIG. 12 is a sectional view showing, in the spindle head device of FIG. 8, a second unit of the tool retaining mechanism for retaining a second tool holder on the spindle;

BEST MODES FOR CARRYING OUT THE INVENTION

Figure 1:
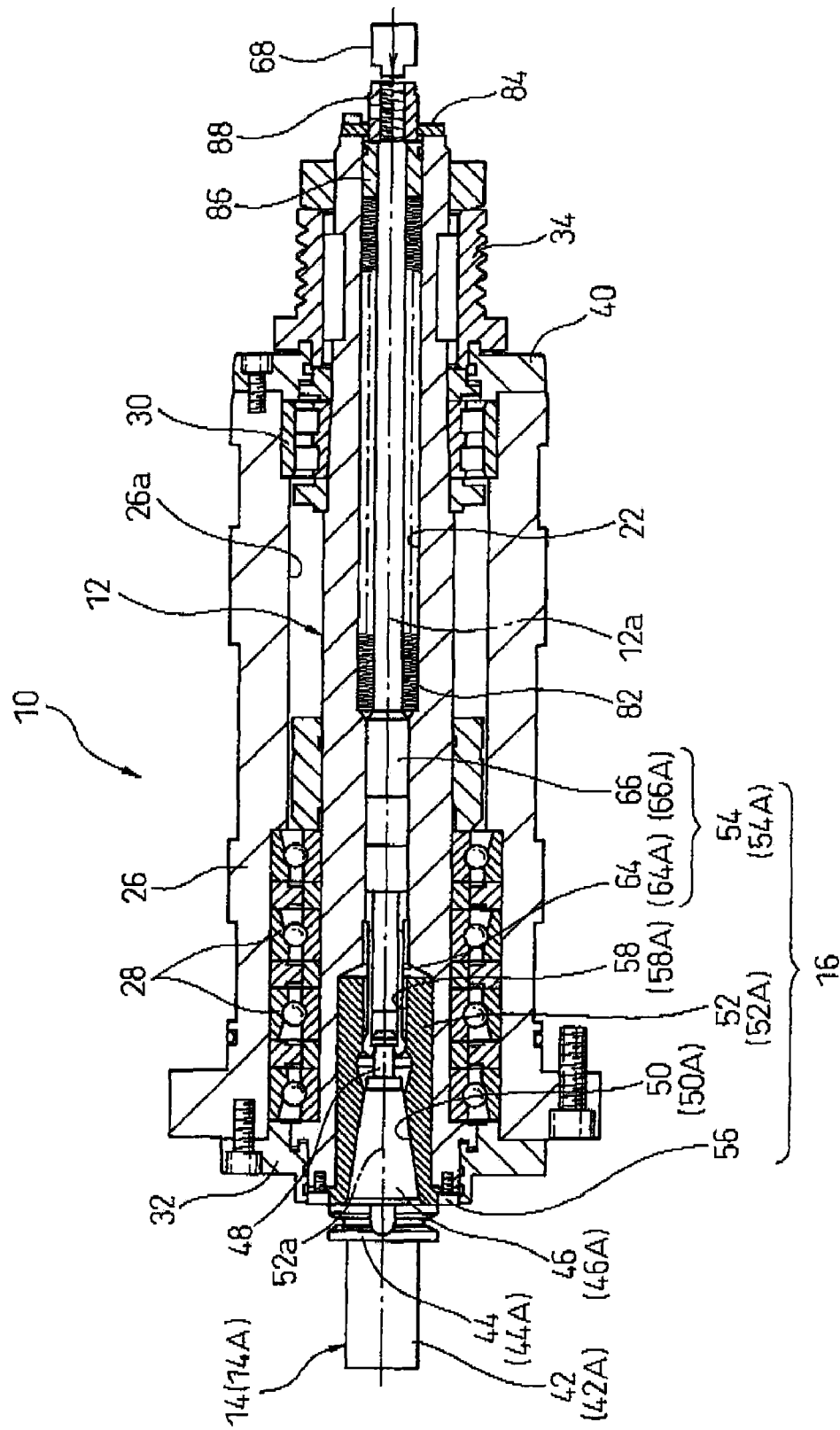
FIG. 1 is a sectional view showing a spindle head device according to a first embodiment of the present invention, in a state where a first tool holder is retained on a common spindle.

The embodiments of the present invention are described below in detail, with reference to the accompanying drawings. In the drawings, same or similar components are denoted by common reference numerals.

Figure 2:
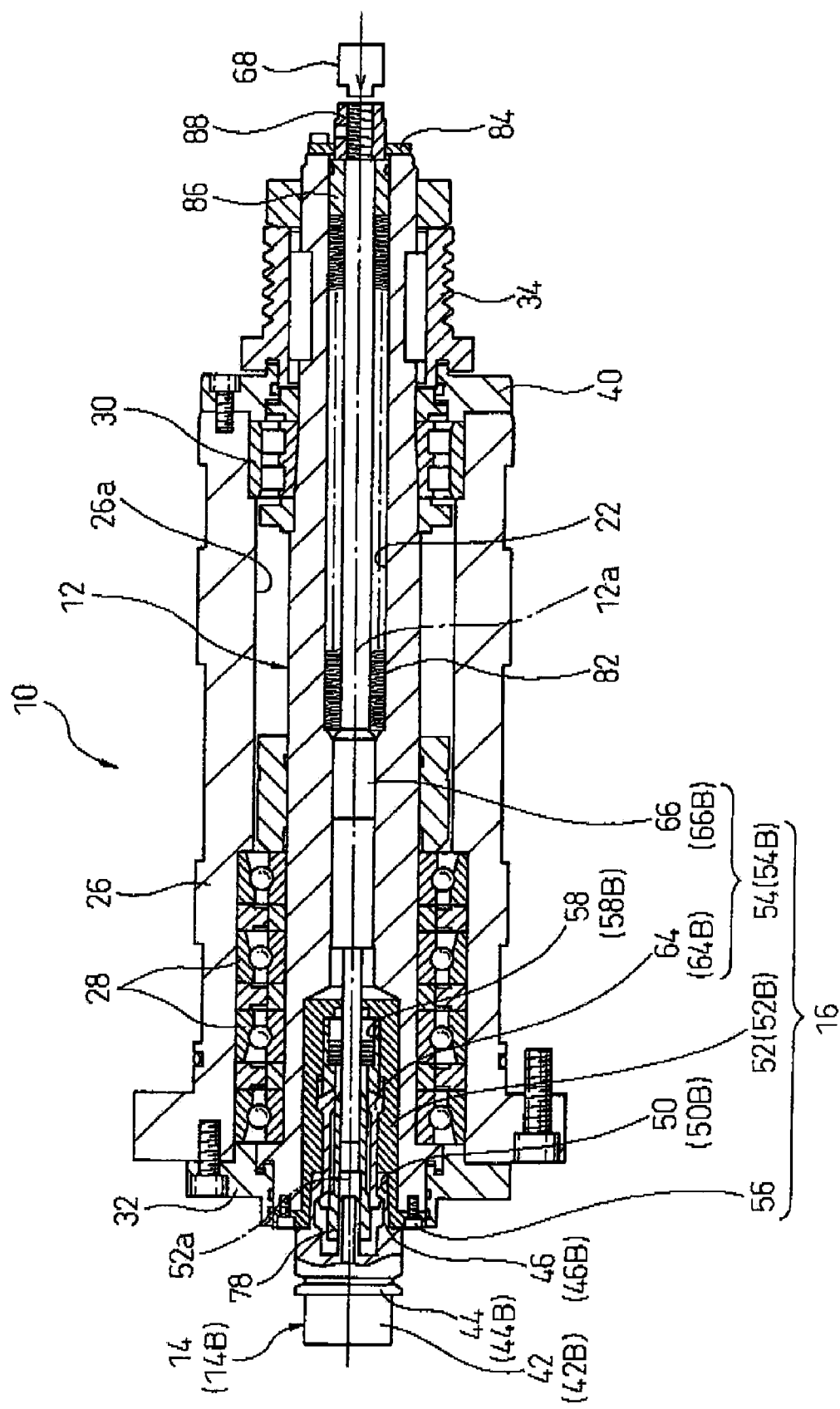
FIG. 2 is a sectional view showing the spindle head device of FIG. 1, in a state where a second tool holder is retained on the common spindle.
Figure 3:
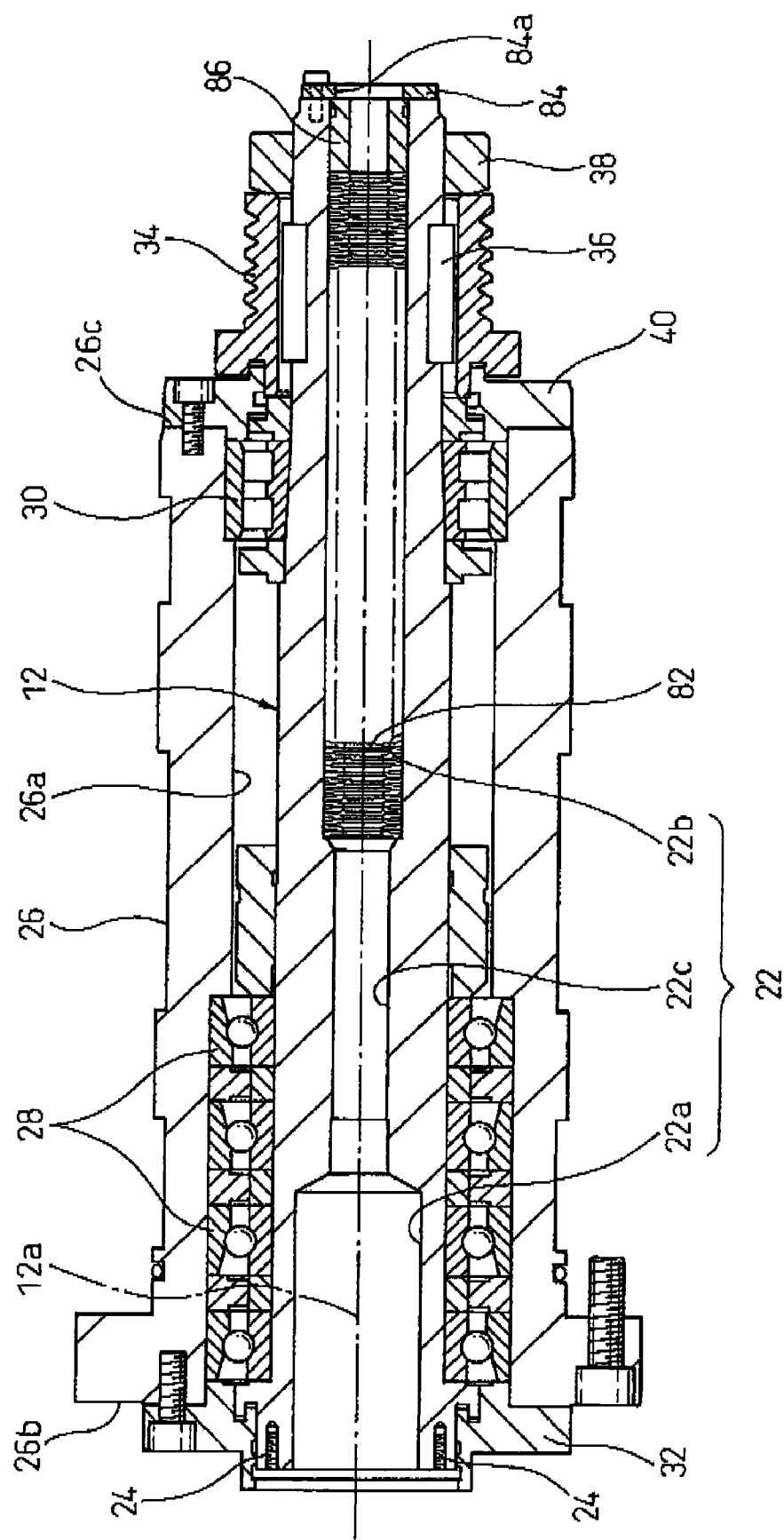
FIG. 3 is a sectional view showing the spindle head device of FIG. 1, in a state where a tool retaining mechanism is detached from the spindle.
Figure 4:
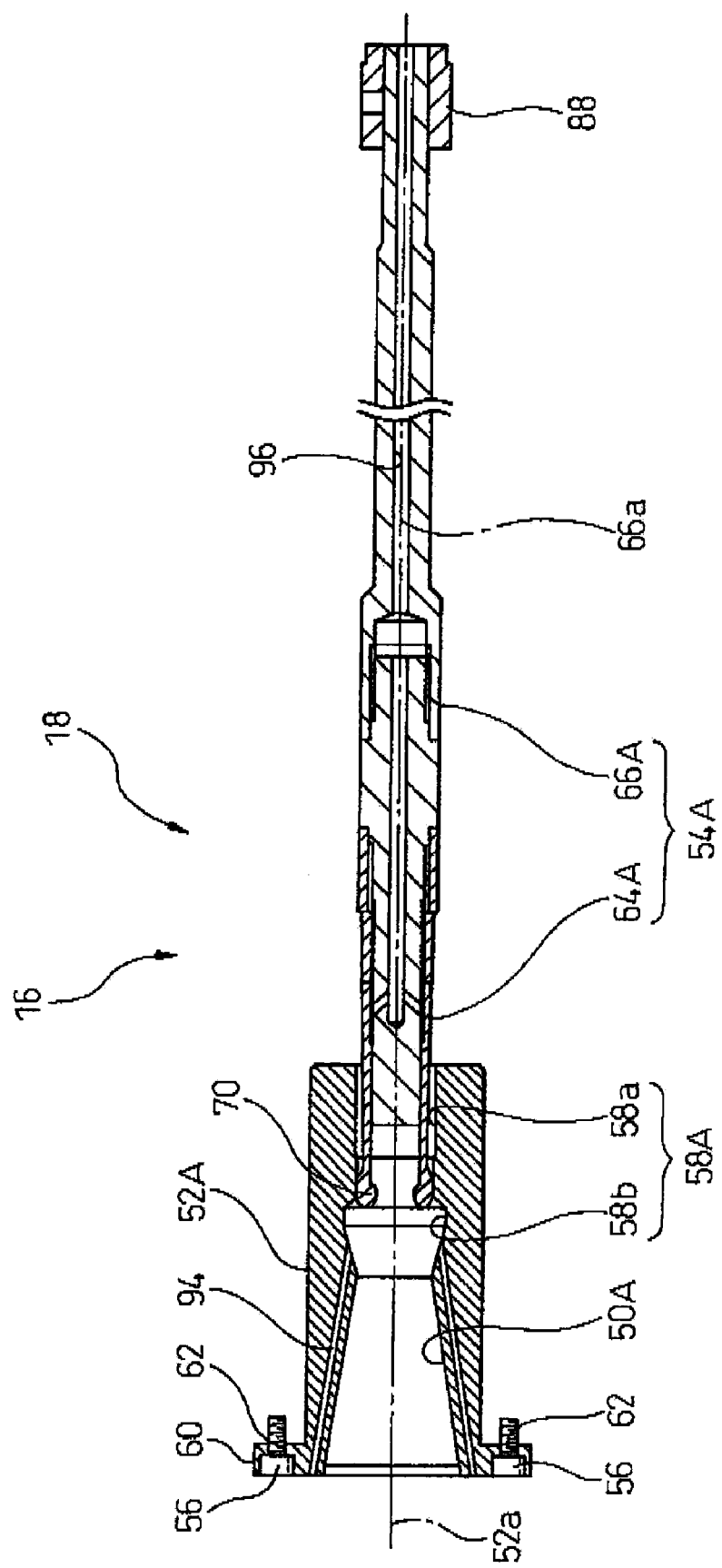
FIG. 4 is a sectional view showing, in the spindle head device of FIG. 1, a first unit of the tool retaining mechanism for retaining a first tool holder on the spindle.
Figure 5:
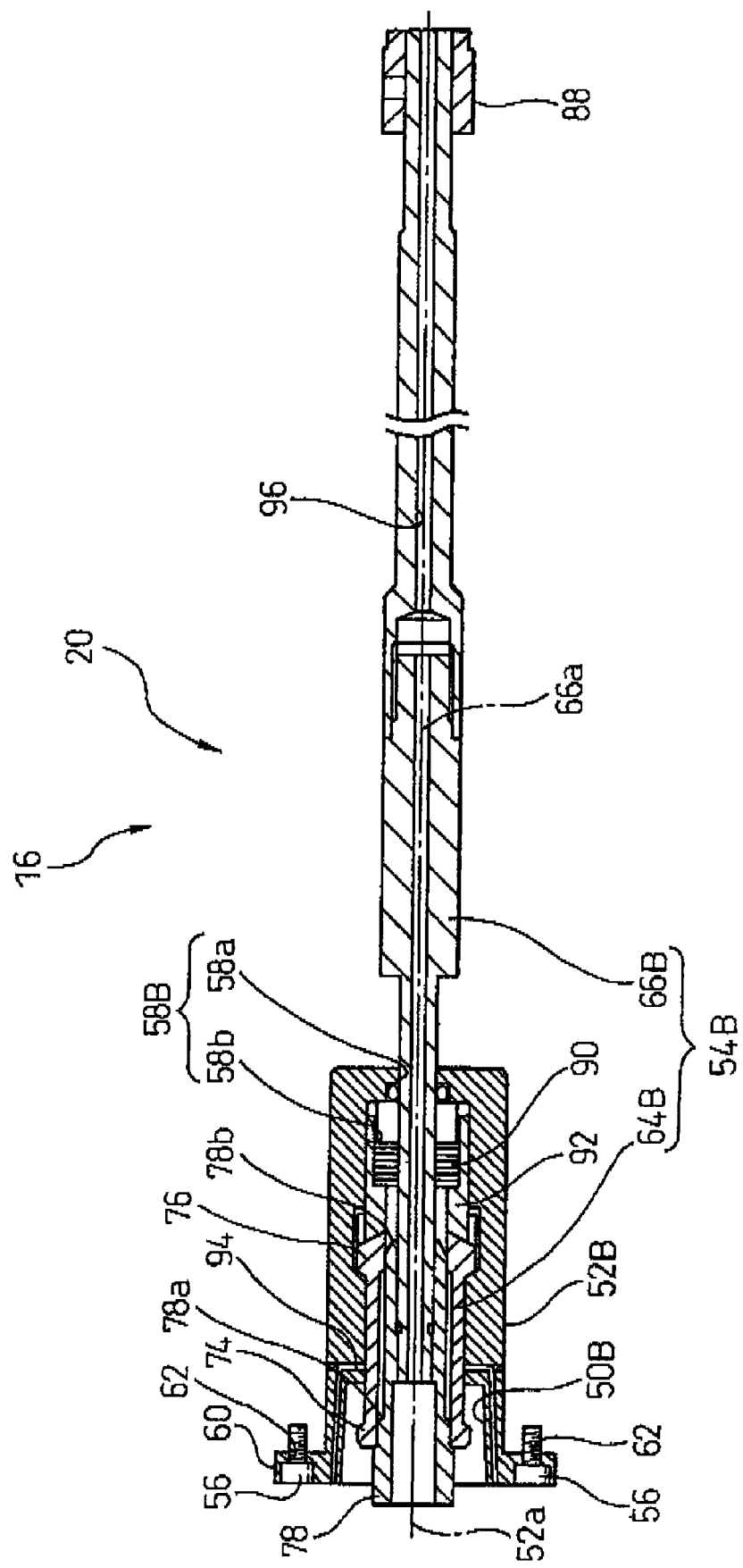
FIG. 5 is a sectional view showing, in the spindle head device of FIG. 1, a second unit of the tool retaining mechanism for retaining a second tool holder on the spindle.

Referring to the drawings, FIGS. 1 and 2 are illustrations showing a spindle head device 10 according to a first embodiment of the present invention, in respective states where different types of tool holders 14A, 14B (generally referred to as a tool holder 14) are retained on a common spindle 12; FIG. 3 is an illustration showing the spindle head device 10 in a state where a tool retaining mechanism 16 is detached from the spindle 12; FIG. 4 is an illustration showing a first unit 18 of the tool retaining mechanism 16 for retaining the first tool holder 14A on the spindle 12; and FIG. 5 is an illustration showing a second unit 20 of the tool retaining mechanism 16 for retaining the second tool holder 14B on the spindle 12. The spindle head device 10 is installed in a machine tool equipped with a spindle (so-called a tool spindle) fixedly supporting a tool and rotating, such as a milling machine, a machining center, etc.

As shown in FIGS. 1 and 2, the spindle head device 10 includes the spindle 12, and the tool retaining mechanism 16 detachably retaining the tool holder 14 on the spindle 12. The spindle 12 is a hollow tubular member having a center axis 12*a* and is provided, along the center axis 12*a*, with a stepped spindle-through-hole 22 penetrating in an axial direction. The spindle-through-hole 22 includes a front portion 22*a* defined at a predetermined length region adjacent to an axial front end (a left end, in the drawing) of the spindle 12 and having a maximum inner diameter, a rear portion 22*b* defined at a predetermined length region adjacent to an axial rear end (a right end, in the drawing) of the spindle 12 and having an inner diameter smaller than that of the front portion 22*a*, and an intermediate portion 22*c* defined at a region between the front portion 22*a* and the rear portion 22*b* and having a minimum inner diameter (FIG. 3). On the front end surface of the spindle 12, a plurality of internal threads 24 are formed to be recessed in the axial direction at predetermined positions around the opening end of the front portion 22*a* of the spindle-through-hole 22.

The spindle 12 is mounted within a cavity 26*a* provided in a housing 26 of the spindle head device 10 in a manner rotatable about the axis through a ball bearing 28 and a roller bearing 30. The outer surface of the axial front end region of the spindle 12, projecting frontward (leftward, in the drawing) from the cavity 26*a* of the housing 26, is covered, in a relatively rotatable manner, by a front cover 32 (also serving as an outer ring support of the ball bearing 28) fixed to the front end surface 26*b* of the housing 26. A pulley 34 connected to a not-shown driving source for the rotation of the spindle, such as a servo motor, is fixed to the outer surface of the axial rear end region of the spindle 12, projecting rearward (rightward, in the drawing) from the cavity 26*a* of the housing 26, by using a key 36 and a nut 38 (FIG. 3). The pulley 34 is disposed, in a relatively rotatable manner, adjacent to the rear side of a rear cover 40 (also serving as an outer ring support of the roller bearing 30) fixed to the rear end surface 26*c* of the housing 26. The spindle 12 having the above configuration is provided by machining in high precision the outer surface thereof adapted to be fitted to the bearings 28, 30.

As shown in FIGS. 1 and 2, the tool holder 14 is provided with a chuck 42 (a general term representing a chuck 42A of the first tool holder 14A and a chuck 42B of the second tool holder 14B) (the chuck may be provided with, e.g., a not-shown chucking element) for chucking a tool (not shown), a flange 44 (a general term representing a flange 44A of the first tool holder 14A and a flange 44B of the second tool holder 14B) adjacent to the chuck 42 and adapted to be grasped by a not-shown grasping section of, e.g., an automatic tool changer (ATC), and a shank 46 (a general term representing a shank 46A of the first tool holder 14A and a shank 463 of the second tool holder 14B) adjacent to the flange 44 and adapted to be retained by the tool retaining mechanism 16.

The shank 46A of the first tool holder 14A is configured to have an outer surface in the shape of a circular truncated cone (with 7/24 taper) defined in JIS (JBS) and be provided with a pull stud 48 defined in JIS (JBS) fixed at the distal end of the shank (JIS B101, B6339; JBS 4001, 4002, etc.). On the other hand, the shank 46B of the second tool holder 14B is configured to be provided with a thin-wall, hollow tubular body having an outer surface in the shape of a circular truncated cone (with 1/10 taper) defined in DIN (DIN 69063-5, 69893-5, etc.).

As shown in FIGS. 1 and 2, the tool retaining mechanism 16 includes a tool support member 52 (a general term representing a tool support member 52A for the first tool holder 14A and a tool support member 52B for the second tool holder 14B) provided with a receiving recess 50 (a general term representing a receiving recess 50A, for the first tool holder 14A and a receiving recess 50B for the second tool holder 14B) detachably receiving the shank 46 of the tool holder 14; a tool clamp member 54 (a general term representing a tool clamp member 54A for the first tool holder 14A and a tool clamp member 54B for the second tool holder 14B) disposed to be displaceable with respect to the tool support member 52 between an operative position and an inoperative position, as described later, wherein the tool clamp member 54, at the operative position, clamps the shank 46 of the tool holder 14 and fixedly holds the shank 46 in the receiving recess 50 of the tool support member 52, and at the inoperative position, releases the shank 46 and allows the tool holder 14 to be attached and detached to and from the receiving recess 50; and a mounting member 56 detachably mounting the tool support member 52 and the tool clamp member 54 to the spindle 12.

The receiving recess 50A of the tool support member 52A used for the first tool holder 14A has an inner surface in the shape of a circular truncated cone (with 7/24 taper) defined in JIS (JBS) (JIS B6101, B6339; JBS 4001, 4002, etc.). On the other hand, the receiving recess 50B of the tool support member 52B used for the second tool holder 14B has an inner surface in the shape of a circular truncated cone (with 1/10 taper) defined in DIN (DIN 69063-5, 69893-5, etc.).

The tool support member 52 is a hollow tubular member having a center axis 52a and is provided, along the center axis 52a, with the receiving recess 50 defining a front end opening having a maximum inner diameter and formed in a predetermined length region adjacent to an axial front end (a left end, in the drawing) of the member, and along the center axis 52a, with a stepped member-through-hole 58 (a general term representing a member-through-hole 58A of the tool support member 52A and a member-through-hole 58B of the tool support member 52B) penetrating in an axial direction and communicating with a rear end opening of the receiving recess 50. The member-through-hole 58 includes a rear portion 58a defined in a predetermined length region adjacent to an axial rear end (a right end, in the drawing) of the tool support member 52 and having a minimum inner diameter, and a front portion 58b defined in a region between the receiving recess 50 and the rear portion 58a and having an inner diameter larger than that of the rear portion 58a (FIGS. 4 and 5).

As shown in FIGS. 4 and 5, the tool support member 52 is provided, in the axial front end region thereof, with a flange portion 60 formed to project outward in a radial direction. A plurality of through-holes 62 are formed in the flange portion 60 at predetermined positions around the front end opening of the receiving recess 50, and bolts 56 as the mounting members 56 are inserted into the respective through-holes 62. The tool support member 52 is dimensioned so that the tubular portion thereof other than the flange portion 60 is contained in and snugly fitted within the front portion 22a (FIG. 3) of the spindle-through-hole 22 of the spindle 12.

In a state where the tool support member 52 is properly contained in the front portion 22a of the spindle-through-hole 22, the tool support member 52 is fixed to the spindle 12 by inserting the mounting members (or bolts) 56 into respective through-holes 62 of the flange portion 60 and screwing the formers into the respective internal threads 24 (FIG. 3) formed in the front end surface of the spindle 12. In this state, the center axis 52a of the tool support member 52 coincides with the center axis 12a of the spindle 12 (FIGS. 1 and 2). When removing the mounting members (or bolts) 56 from the corresponding internal threads 24, the tool support member 52 can be detached from the spindle 12.

As shown in FIGS. 1 and 2, the tool clamp member 54 includes a plurality of movable clamping elements 64 (a general term representing movable clamping elements 64A of the tool clamp member 54A and movable clamping elements 64B of the tool clamp member 54B) contained in the member-through-hole 58 of the tool support member 52 so as to be displaceable in a radial direction, and an actuating element 66 (a general term representing an actuating element 66A of the tool clamp member 54A and an actuating element 66B of the tool clamp member 54B) contained in the rear portion 22b and intermediate portion 22c of the spindle-through-hole 22 of the spindle 12 so as to be displaceable in an axial direction, the actuating element 66 acting to displace the movable clamping elements 64 in the radial direction by the axial displacement of the actuating element. In this configuration, as described later, it is possible to reliably retain the tool holder 14 in the receiving recess 50 of the tool support member 52 by a relatively simple and downsized structure.

The actuating element 66 is a rod-like element having a center axis 66a, and the movable clamping elements 64 are disposed to surround the axial front end (a left end, in the drawing) region of the actuating element and suitably dispersed in a circumferential direction. The actuating element 66 is disposed relative to the tool support member 52 with the center axis 66a of the actuating element 66 coinciding with the center axis 52a of the tool support member 52, and in this state, the axial front end region of the actuating element 66 is contained, together with the movable clamping elements 64, in the member-through-hole 58 so as to be displaceable in the axial direction (FIGS. 4 and 5). The actuating element 66 is driven by a drive mechanism (e.g., a hydraulic cylinder mechanism) provided externally to the spindle head device 10 (a cylinder end piece 68 is shown in FIGS. 1 and 2), and acts to displace the movable clamping elements 64 between a shank releasing position and a shank clamping position due to the axial displacement of the actuating element 66 in the spindle-through-hole 22. In this connection, the actuating element 66 may be configured by combining two parts with each other, as shown in FIGS. 4 and 5, or alternatively, may be configured as a single unitary part.

As shown in FIG. 4, each movable clamping element 64A of the tool clamp member 54A is an arm-like element fixed at the proximal end (a right end, in the drawing) thereof to the actuating element 66A and provided with an inward claw 70 at the distal free end (a left end, in the drawing) thereof, and is capable of bending or deflecting in the radial direction relative to the center axis 66a of the actuating element 66A in a cantilever fashion under the elastic action of the movable clamping element. The movable clamping elements 64A are arranged so as to surround the pull stud 48 at the distal end of the shank 46A of the first tool holder 14A received in the receiving recess 50A of the tool support member 52A, in a state where the respective distal end regions of the movable clamping elements project by a predetermined length from the front end of the actuating element 66A (FIG. 1). The movable clamping elements 64A elastically bend to rock in the radial direction in accordance with the axial displacement of the actuating element 66A, and make the distal-end claws 70 engage with a shoulder surface 72 (FIG. 6A) formed on the outer surface of the pull stud 48 from the outside of the pull stud, so that the movable clamping elements 64A clamp the pull stud 48, as described later.

On the other hand, as shown in FIG. 5, each movable clamping element 643 of the tool clamp member 54B is an arm-like element provided with an outward claw 74 at the front end (a left end, in the drawing) thereof and a bulging portion 76 at the rear end (a right end, in the drawing) thereof, and is capable of shifting, without being deformed, in the radial direction relative to the center axis 66a of the actuating element 665 substantially in a parallel translation manner. The movable clamping elements 64B are arranged so that the respective front end regions thereof are inserted into the inner cavity of the shank 46B of the second tool holder 14B received in the receiving recess 50B of the tool support member 52B, in a state where the respective radially inner surface of the movable clamping elements face to the outer surface of a cam element 78 provided at the front end of the actuating element 66B (FIG. 2). The movable clamping elements 643 individually shift in parallel translation in the radial direction in accordance with the axial displacement of the actuating element 66B, and make the front-end claws 74 engage with a shoulder surface 80 (FIG. 7A) formed on the inner surface of the shank 46B from the inside of the shank, so that the movable clamping elements 643 clamp the shank 46B, as described later.

As shown in FIGS. 1 and 2, the tool retaining mechanism 16 further includes a biasing member 82 contained in the rear portion 22b (FIG. 3) of the spindle-through-hole 22 of the spindle 12 and elastically biasing the tool clamp member 54 from the inoperative position to the operative position, and a locking member 84 fixedly disposed relative to the spindle 12 and preventing the biasing member 82 from separating from the spindle-through-hole 22. In this configuration, as described later, when the tool retaining mechanism 16 is changed to another one, the biasing member 82 can be commonly used to obtain clamping force, and even when the tool retaining mechanism is detached from the spindle 12, the biasing member 82 can be prevented from separating from the spindle-through-hole 22.

The illustrated biasing member 82 is constituted, by way of example, from a plurality of coned-disc springs stacked in the axial direction and disposed to surround the actuating element 66 of the tool clamp member 54. The stack of the coned-disc springs 82 is supported at the axial front end (a left end, in the drawing) thereof on a shoulder surface between the rear portion 22b and the intermediate portion 22c, of the spindle-through-hole 22 and at the axial rear end (a right end, in the drawing) thereof on a spring seat 86 attached to the axial rear end region of the actuating element 66, and is held in the rear portion 22b of the spindle-through-hole 22 by a nut 88 secured to the axial rear end of the actuating element 66.

As illustrated, the spring seat 86 attached to the actuating element 66 has an outer diameter approximate to an inner diameter of the rear portion 22b of the spindle-through-hole 22, and the nut 88 secured to the actuating element 66 has an outer diameter smaller than the outer diameter of the spring seat 86. The locking member 84 is an annular plate-like member fixed to the axial rear end surface (a right end surface, in the drawing) of the spindle 12, and is provided with a center opening 84a having a diameter slightly larger than the outer diameter of the nut 88 secured to the actuating element 66 and smaller than the outer diameter of the spring seat 86 attached to the actuating element 66 (FIG. 3). Thus, the locking member 84 permits the axial displacement of the actuating element 66 and nut 88, caused by the driving operation of the drive mechanism 68, in a state where the tool retaining mechanism 16 is properly incorporated in the spindle 12, whereas the locking member 84 engages with the spring seat 86 so as to prevent the biasing member 82 from separating from the spindle-through-hole 22, in a state where the tool retaining mechanism 16 is detached from the spindle 12 (FIG. 3). It should be noted that, when the tool holder 14 is not retained by the tool retaining mechanism 16, the locking member 84 also functions to prevent the unintended rearward movement of the actuating element 66.

The tool retaining mechanism 16 includes, in a mutually interchangeable manner, a first unit 18 (FIG. 4) including the first tool support member 52A provided with the receiving recess 50A for the first tool holder 14A and the first tool clamp member 54A carrying out a first displacement motion between the operative position and the inoperative position (i.e., the axial displacement of the actuating element 66A and the radial rocking displacement of the movable clamping elements 64A), and a second unit 20 (FIG. 5) including the second tool support member 52B provided with the receiving recess 50B for the second tool holder 14B, different in shape from the receiving recess 50A, and the second tool clamp member 54B carrying out a second displacement motion, different from the first displacement motion, between the operative position and the inoperative position (i.e., the axial displacement of the actuating element 66B and the radial parallel-translation displacement of the movable clamping elements 64B). The first unit 18 and the second unit 20 are handled and stored in a state where the respective tool support members 52A, 52B and the respective tool clamp members 54A, 54B are combined with each other as described.

Each of the first unit 18 and the second unit 20 is mounted to the spindle 12 in such a manner that, in a state where the nut 88 is removed from the rear end of the actuating element 66, the actuating element 66 is inserted through the front end opening of the front portion 22a (FIG. 3) of the spindle-through-hole 22 into the intermediate portion 22c and rear portion 22b (FIG. 3) of the spindle-through-hole 22, and the tool support member 52 is inserted into the front portion 22a of the spindle-through-hole 22. Further, as described, the tool support member 53 is fixed to the spindle 12 in such a manner that, in a state where the tool support member 52 and the tool clamp member 54 are properly contained in the spindle-through-hole 22, the mounting members (or bolts) 56 are individually screwed into the internal threads 24 (FIG. 3) in the front end surface of the spindle 12. Thereafter, the nut 88 is attached to the rear end of the actuating element 66, and thereby the mounting of the first unit 18 or the second unit 20 to the spindle 12 is completed.

In a state where the first unit 18 or the second unit 20 is properly mounted to the spindle 12, the tool support member 52 and the tool clamp member 54 (the movable clamping elements 64 and the actuating element 66) are disposed coaxially with respect to the spindle 12, and during the axial displacement of the actuating element 66 in the spindle-through-hole 22, the tool support member 52 is held in the spindle-through-hole 22 in a stationary manner. In order to perform the interchange of the first unit 18 and the second unit 20, it is only required to take out the mounting members (or bolts) 56 from the corresponding internal threads 24, remove the nut 88 from the rear end of the actuating element 66, and detach the tool support member 52 and the tool clamp member 54 from the spindle 12.

Referring now to FIGS. 6A to 7B, a tool-shank clamping/releasing operation performed by the tool clamp member 54 of the tool retaining mechanism 16 will be described.

As shown in FIG. 6A, the tool clamp member 54A for holding the tool holder 14A is arranged so that, when the actuating element 66A is located at the rear end position of an axial displacement stroke (i.e., when the drive mechanism 68 (FIG. 1) is at rest), the movable clamping elements 64A are drawn into the rear portion 58a of the member-through-hole 58A of the tool support member 52A up to the distal ends of the movable clamping elements. Thereby, the movable clamping elements 64A are subjected to a pressing force from the wall surface of the rear portion 58a of the member-through-hole 58A so as to be elastically deformed radially inward in a cantilever fashion, and thus are maintained in a state where the respective claws 70 are disposed closer to each other.

In this operation, if the shank 46A of the tool holder 14A has been received in the receiving recess 50A of the tool support member 52A, the movable clamping elements 64A act to bring the respective claws 70 into engagement with the shoulder surface 72 of the pull stud 48 of the tool holder 14A from the outside of the pull stud, and thus to firmly clamp the pull stud 48 (FIG. 6A) under the large elastic biasing force of the biasing member 82 (FIG. 1). In this state, the tool clamp member 54A is disposed at the operative position (i.e., the movable clamping elements 64A are disposed at shank clamping positions), and thus the tool holder 14A is firmly retained by the tool support member 52A.

From the above-described state, when the drive mechanism starts to operate (shown by an arrow in FIG. 1) and displaces the actuating element 66A in an axial frontward direction in the spindle-through-hole 22 (FIG. 1) against the biasing force of the biasing member 82, the distal end regions of the movable clamping elements 64A enter into the front portion 58b of the member-through-hole 58A of the tool support member 52A. Thereby, as shown in FIG. 6B, the movable clamping elements 64A are released from the pressing force from the wall surface of the member-through-hole 58A so as to elastically recover and rock radially outward, and thus are shifted so as to displace the respective claws 70 away from each other.

In this operation, it the shank 46A of the tool holder 14A has been received in the receiving recess 50A of the tool support member 52A, the movable clamping elements 64A act to displace the respective claws 70 outwardly away from the shoulder surface 72 of the pull stud 48 of the tool holder 14A, and thus to release the pull stud 48 (FIG. 6B). In this state, the tool clamp member 54A is disposed at the inoperative position (i.e., the movable clamping elements 64A are disposed at shank releasing positions), and thus the tool holder 14A is allowed to be attached and detached to and from the receiving recess 50A of the tool support member 52A.

Figure 7A:
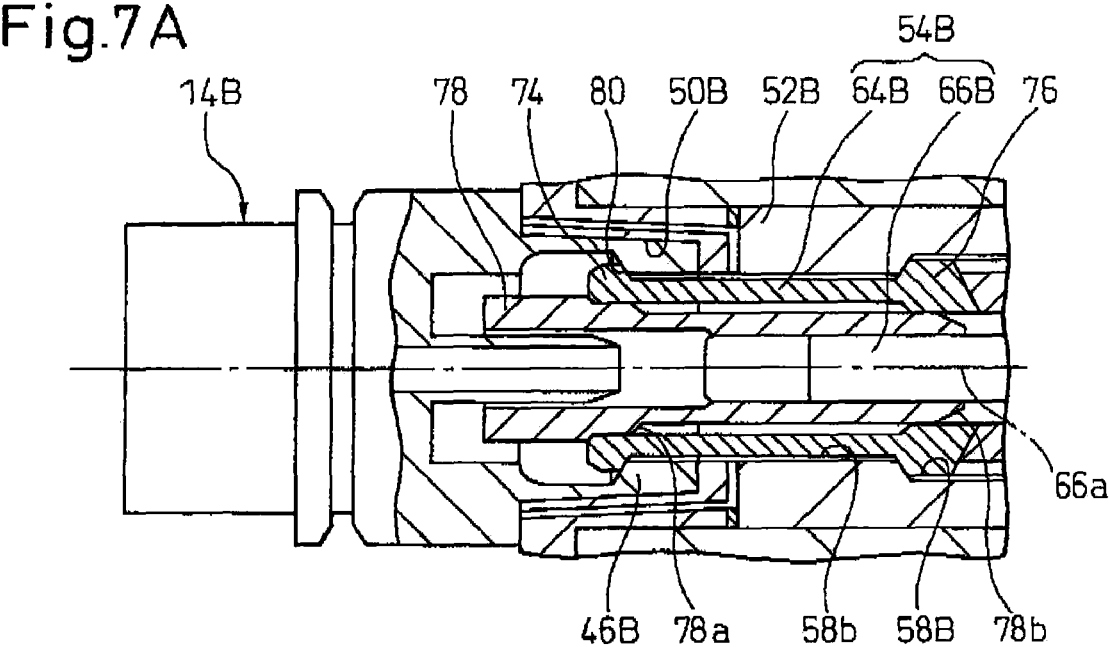
FIGS. 7A and 7B are partial enlarged sectional views explaining tool-shank clamping/releasing operations performed for the second tool holder by a tool clamp member of the tool retaining mechanism in the spindle head device of FIG. 1, and showing respective states at the operative position and the inoperative position.

As shown in FIG. 7A, the tool clamp member 54B for holding the tool holder 14B is arranged so that, when the actuating element 66B is located at the rear end position of an axial displacement stroke (i.e., when the drive mechanism 68 (FIG. 2) is at rest), the movable clamping elements 64B are carried, at the inner surfaces thereof, on the outer surface of the cam element 78 provided at the front end of the actuating element 66B. More specifically, the front-end claw 74 of each movable clamping element 64B runs over the front cam surface 78a of the cam element 78, and generally simultaneously, the rear-end bulging portion 76 runs over the rear cam surface 78b of the cam element 78. Thereby, the movable clamping elements 64B are firmly held between the outer surface of the cam element 78 and the wall surface of the front portion 58b of the member-through-hole 58B of the tool support member 52B, and thus are maintained in a state where the respective claws 74 are disposed away from each other.

In this operation, if the shank 46B of the tool holder 14B has been received in the receiving recess SOB of the tool support member 52B, the movable clamping elements 64B act to bring the respective claws 74 into engagement with the shoulder surface 80 of the shank 46B of the tool holder 14B from the inside of the shank, and thus to firmly clamp the shank 46B (FIG. 7A) under the large elastic biasing force of the biasing member 82 (FIG. 2). In this state, the tool clamp member 54B is disposed at the operative position (i.e., the movable clamping elements 64B are disposed at shank clamping positions), and thus the tool holder 14B is firmly retained by the tool support member 52B.

Figure 7B:
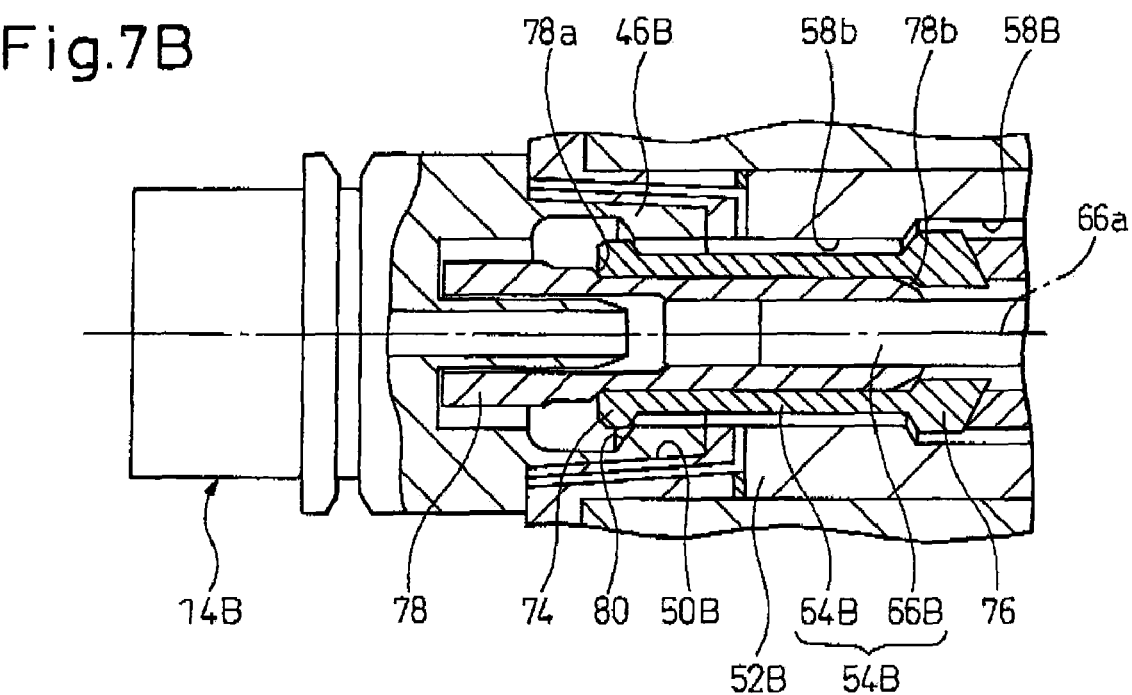

From the above-described state, when the drive mechanism starts to operate (shown by an arrow in FIG. 2) and displaces the actuating element 66B in an axial frontward direction in the spindle-through-hole 22 (FIG. 2) against the biasing force of the biasing member 82, the movable clamping elements 64B move relative to the cam element 78 toward the rear end of the cam element 78, whereby the respective front-end claws 74 slide downward on the front cam surface 78a of the cam element 78, and generally simultaneously, the respective rear-end bulging portions 76 slide downward on the rear cam surface 78b of the cam element 78. Thereby, as shown in FIG. 7B, the movable clamping elements 64B are released from a gap between the outer surface of the cam element 78 and the wall surface of the member-through-hole 58B so as to cause a parallel translation in a radial inward direction, and thus are shifted so as to displace the respective claws 74 close to each other. In this connection, in order to achieve the parallel translation of each movable clamping element 64B, biasing elements (i.e., a spring 90 and a pressing piece 92) for applying axially frontward elastic biasing force to the movable clamping element 64B are contained in the front portion 58b of the member-through-hole 58B of the tool support member 52A (FIG. 5).

In this operation, if the shank 46B of the tool holder 14B has been received in the receiving recess 50B of the tool support member 52B, the movable clamping elements 64B act to displace the respective claws 74 inwardly away from the shoulder surface 80 of the shank 46B of the tool holder 14B, and thus to release the shank 46B (FIG. 7B). In this state, the tool clamp member 54B is disposed at the inoperative position (i.e., the movable clamping elements 64B are disposed at shank releasing positions), and thus the tool holder 14B is allowed to be attached and detached to and from the receiving recess 50B of the tool support member 52B.

Thus, in the spindle head device 10 having the above-described configuration, the tool retaining mechanism 16 is configured to include the tool support member 52 provided with the receiving recess 50 receiving the shank 46 of the tool holder 14, the tool clamp member 54 disposed to be displaceable with respect to the tool support member 52 between the operative position and the inoperative position, and the mounting member 56 detachably mounting the tool support member 52 and the tool clamp member 54 to the spindle 12, so that in the case where several types of tool holders 14 with shanks 46 mutually different in terms of mechanical structures are intended to be used, it is possible to mount, for use, the tool support members 52 provided with the receiving recesses 50 corresponding respectively to the tool holders 14 and the tool clamp members 54 having clamping functions corresponding respectively to the tool holders 14, to the spindle 12 by the mounting member 56, as occasion demands. As a result, it is possible to stably retain the different-type tool holders 14 in an interchangeable manner on the common spindle 12 by the tool retaining mechanisms 16 corresponding respectively to the tool holders 14.

For example, in the case where a user of a machine tool intends to suitably select and use the mechanical configurations respectively complying with JIS and DIN while considering several requirements such as a machining precision, a tool life, an operating noise, etc., it is possible to use various tools attached to the tool holders complying with JIS and the tool holders complying with DIN, in the single machine tool by changing the mechanical configuration of the tool retaining mechanism 16. Therefore, according to the spindle head device 10, it is possible, in a user side, to prevent equipment cost from increasing and maintenance and management from becoming complicated. Also, in a side of manufacturers or vendors of machine tools, it is possible to easily and quickly exchange the mechanical configuration complying with JIS and the mechanical configuration complying with DIN in response to the request of a user.

In the spindle head device 10, irrespective of the type of tool holder 14, the shank 46 thereof is not directly retained on the spindle 12, but is retained in the receiving recess 50 of the tool support member 52 detachably mounted to the spindle 12. Thus, if the receiving recess 50 has been worn by repeated tool-changing works, it is only required to replace the tool support member 52 with new one without replacing or renewing the relatively expensive spindle 12. Therefore, according to the spindle head device 10, even if the tool-changing works are highly frequently performed, the spindle 12 needs not be replaced or renewed, and it is thus possible to prevent maintenance cost from increasing.

In particular, in the spindle head device 10, the tool retaining mechanism 16 includes, in a mutually interchangeable manner, the first unit 18 and the second unit 20 respectively including the tool support members 52A, 52B and the tool clamp members 54A, 54B, so that it is possible to handle each unit 18, 20 in a state where the tool support member 52A, 52B is combined with the tool clamp member 54A, 54B, and thereby to extremely ease the changing work of the tool retaining mechanism 16 relative to the spindle 12.

In the above-described spindle head device 10, as shown in FIGS. 4 and 5, the tool support member 52A, 52B may be provided with a fluid passage 94 for supplying a cleaning fluid or a cooling fluid to the tool holder 14A, 14B (FIGS. 6A and 7A). In this case, a second fluid passage 96 for supplying fluid to the fluid passage 94 of the tool support member 52A, 52B may be formed to penetrate in an axial direction in the actuating element 66A, 66B of the tool clamp member 54A, 54B, and the second fluid passage 96 may be connected to a not-shown fluid supply source. In the illustrated configuration, the fluid discharged from the second fluid passage 96 flows through a space between the movable clamping elements 64A, 64B, and is supplied to the fluid passage 94 of the tool support member 52A, 52B. In this configuration, it is not necessary to form a fluid passage in the spindle 12, so that manufacturing cost of the spindle 12 can be reduced.

Referring now to FIGS. 8 to 12, the configuration of a spindle head device 100 according to a second embodiment of the present invention will be described. The spindle head device 100 has substantially the same configuration as the spindle head device 10 according to the above-described first embodiment, except that the above-described tool retaining mechanism 16 is constituted as a unit including the biasing member 82. Therefore, corresponding components are denoted by common reference numerals, and the explanations thereof are not repeated.

Figure 8:
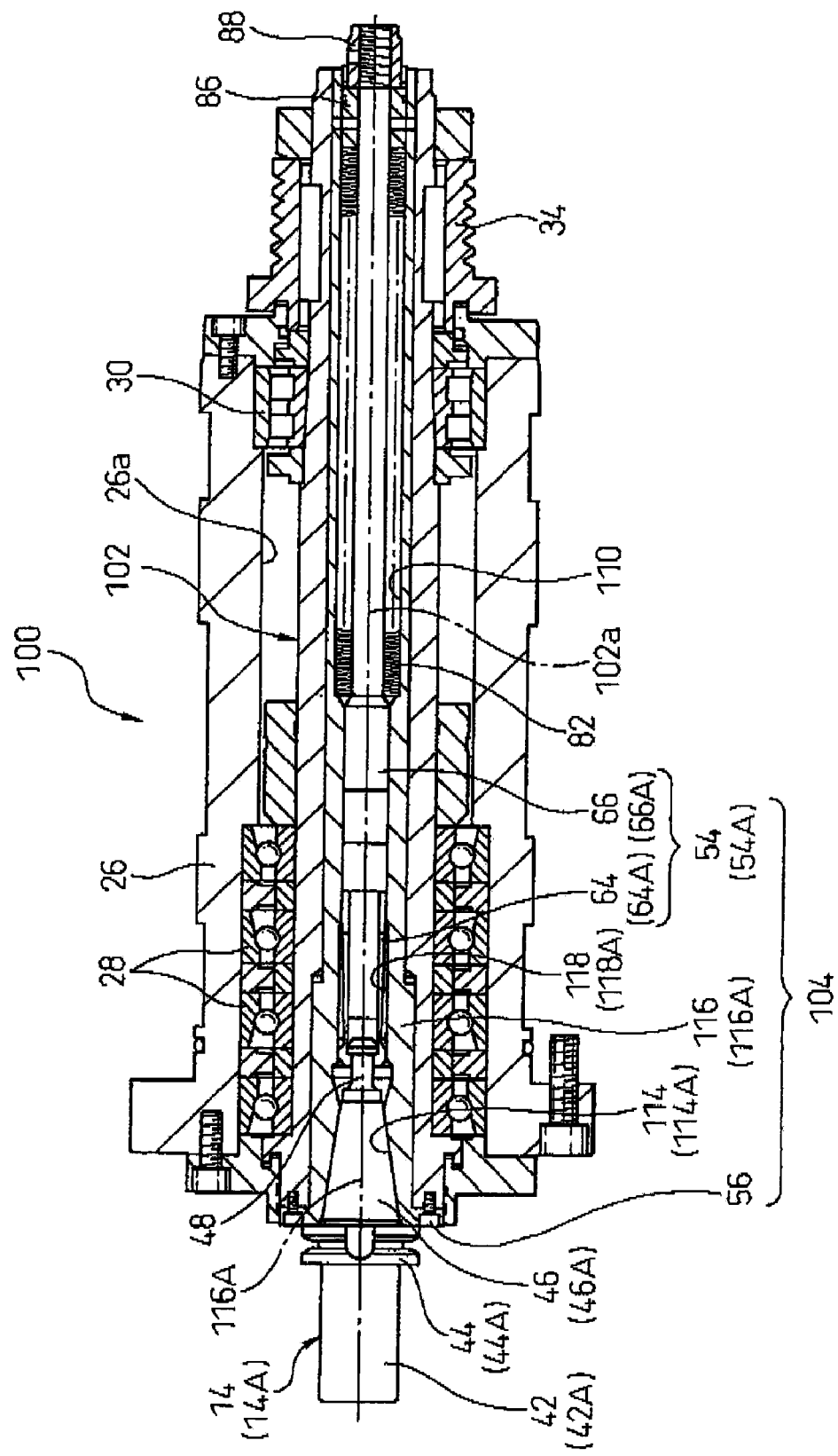
FIG. 8 is a sectional view showing a spindle head device according to a second embodiment of the present invention, in a state where a first tool holder is retained on a common spindle.
Figure 9:
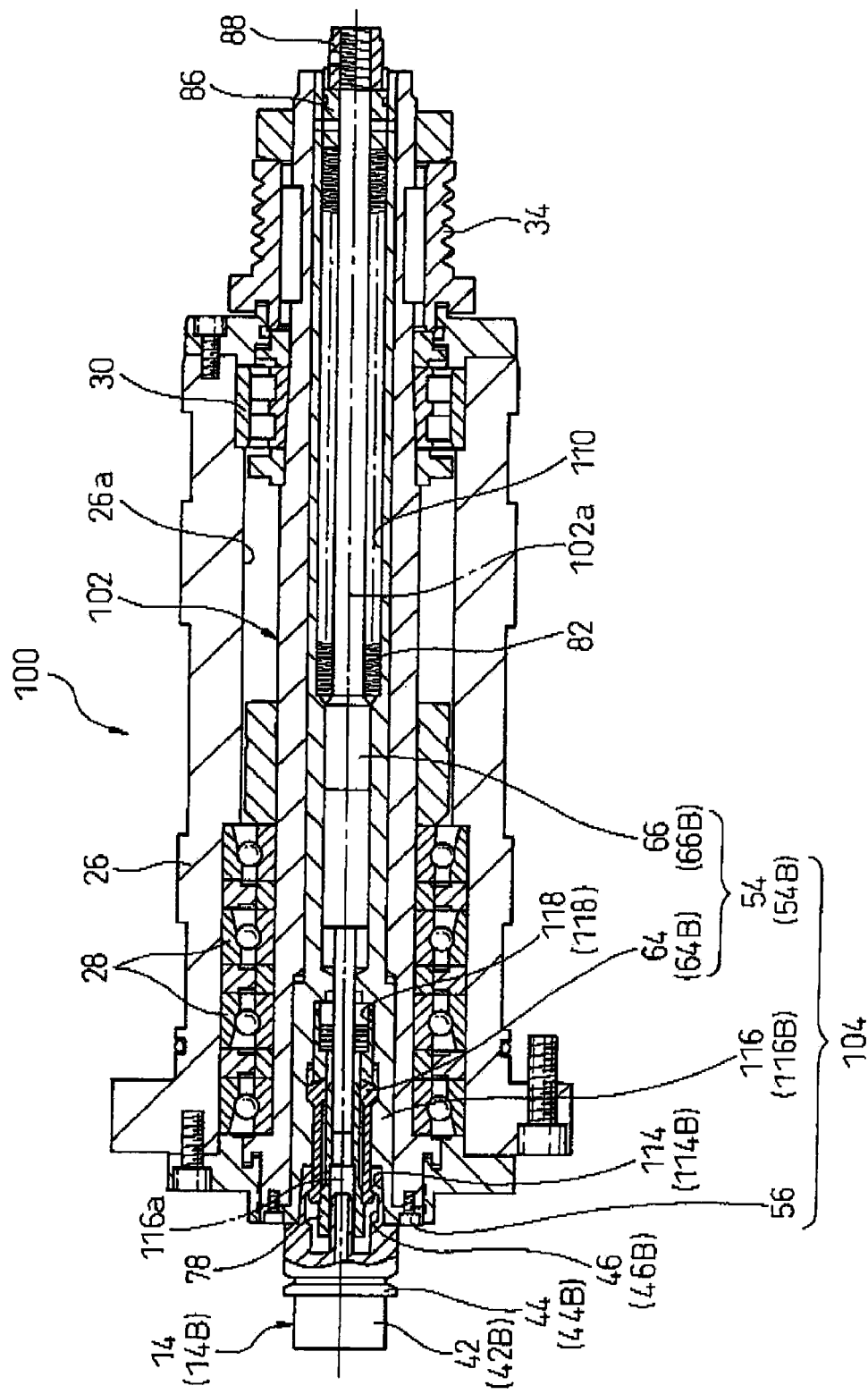
FIG. 9 is a sectional view showing the spindle head device of FIG. 8, in a state where a second tool holder is retained on the common spindle.
Figure 10:
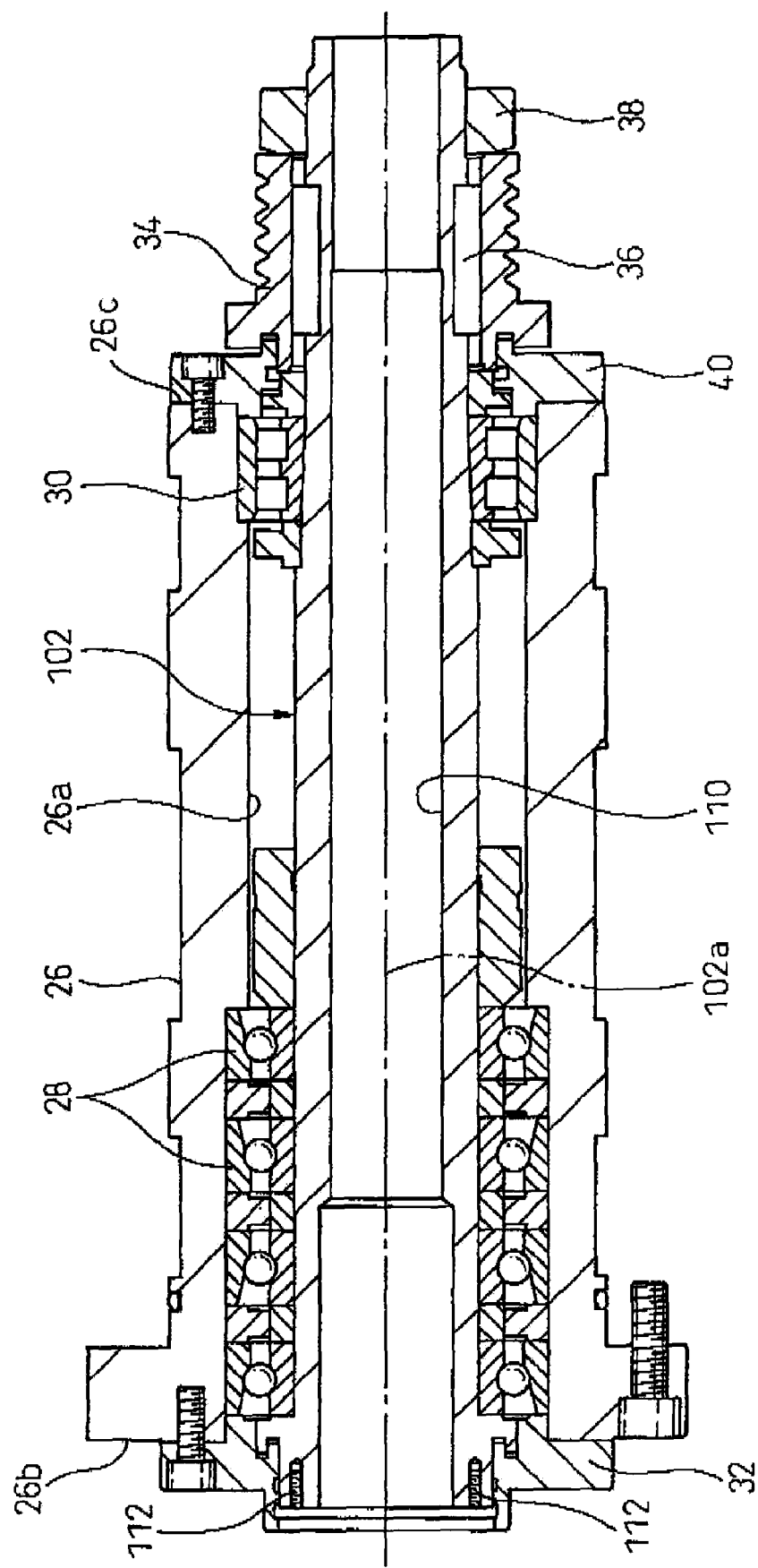
FIG. 10 is a sectional view showing the spindle head device of FIG. 8, in a state where a tool retaining mechanism is detached from the spindle.

FIGS. 8 and 9 are illustrations showing the spindle head device 100 in respective states where different types of tool holders 14A, 14B are retained on a common spindle 102; FIG. 10 is an illustration showing the spindle head device 100 in a state where a tool retaining mechanism 104 is detached from the spindle 102; FIGS. 11A and 11B are illustrations showing a first unit 106 of the tool retaining mechanism 104 for retaining the first tool holder 14A on the spindle 102; and FIG. 12 is an illustration showing a second unit 108 of the tool retaining mechanism 104 for retaining the second tool holder 14B on the spindle 102.

As shown in FIGS. 8 and 9, the spindle head device 100 includes the spindle 102, and the tool retaining mechanism 104 detachably retaining the tool holder 14 on the spindle 102. The spindle 102 is a hollow tubular member having a center axis 102a and is provided, along the center axis 102a, with a stepped spindle-through-hole 110 penetrating in an axial direction. A step provided on a spindle inner-wall surface forming the spindle-through-hole 110 is significantly smaller than the step provided on the inner wall surface of the spindle 12 in the above-described spindle head device 10. On the front end surface of the spindle 102, a plurality of internal threads 112 are formed to be recessed in the axial direction at predetermined positions around the opening end of the spindle-through-hole 110 (FIG. 10).

The spindle 102 is mounted within a cavity 26a provided in a housing 26 of the spindle head device 100 in a manner rotatable about the axis through a ball bearing 28 and a roller bearing 30. In association with the spindle 102, a front cover 32, a pulley 34, a key 36, a nut 38 and a rear cover 40 are provided (rig. 10). The spindle 102 having the above configuration is provided by machining in high precision the outer surface thereof adapted to be fitted to the bearings 28, 30.

The tool retaining mechanism 104 includes a tool support member 116 (a general term representing a tool support member 116A for the first tool holder 14A and a tool support member 116B for the second tool holder 14B) provided with a receiving recess 114 (a general term representing a receiving recess 114A for the first tool holder 14A and a receiving recess 114B for the second tool holder 14B) detachably receiving the shank 46 of the tool holder 14; a tool clamp member 54 (a general term representing a tool clamp member 54A for the first tool holder 14A and a tool clamp member 54B for the second tool holder 14B) disposed to be displaceable with respect to the tool support member 116 between an operative position and an inoperative position, as described later, wherein the tool clamp member 54, at the operative position, clamps the shank 46 of the tool holder 14 and fixedly holds the shank 46 in the receiving recess 114 of the tool support member 116, and at the inoperative position, releases the shank 46 and allows the tool holder 14 to be attached and detached to and from the receiving recess 114; and a mounting member 56 detachably mounting the tool support member 116 and the tool clamp member 54 to the spindle 102.

The receiving recess 114A of the tool support member 116A used for the first tool holder 14A has an inner surface in the shape of a circular truncated cone (with 7/24 taper) defined in JIS (JBS) (JIS B6101, B6339; JBS 4001, 4002, etc.). On the other hand, the receiving recess 114B of the tool support member 116B used for the second tool holder 14B has an inner surface in the shape of a circular truncated cone (with 1/10 taper) defined in DIN (DIN 69063-5, 69893-5, etc.).

The tool support member 116 is a hollow tubular member having a center axis 116a and is provided, along the center axis 116a, with the receiving recess 114 defining a front end opening having a maximum inner diameter and formed in a predetermined length region adjacent to an axial front end (a left end, in the drawing) of the member, and along the center axis 116a, with a stepped member-through-hole 118 (a general term representing a member-through-hole 118A of the tool support member 116A and a member-through-hole 118B of the tool support member 116B) penetrating in an axial direction and communicating with a rear end opening of the receiving recess 114. The member-through-hole 118 includes a rear portion 118a defined in a predetermined length region adjacent to an axial rear end (a right end, in the drawing) of the tool support member 116 and having a maximum inner diameter, a front portion 118b defined in a region adjacent to the rear end opening of the receiving recess 114 and having an inner diameter smaller than that of the rear portion 118a, and an intermediate portion 118c defined in a predetermined length region between the rear portion 118a and the front portion 118b and having a minimum inner diameter (FIGS. 11A and 12).

As shown in FIGS. 11A and 12, the tool support member 116 is provided, in the axial front end region thereof, with a flange portion 120 formed to project outward in a radial direction. A plurality of through-holes 122 are formed in the flange portion 120 at predetermined positions around the front end opening of the receiving recess 114, and bolts 56 as the mounting members 56 are inserted into the respective through-holes 122. The tool support member 116 is dimensioned so that the tubular portion thereof other than the flange portion 120 is contained in and snugly fitted within the spindle-through-hole 110 of the spindle 102 over the entire axial length of the spindle-through-hole 110.

In a state where the tool support member 116 is properly contained in the entire spindle-through-hole 110, the tool support member 116 is fixed to the spindle 102 by inserting the mounting members (or bolts) 56 into respective through-holes 122 of the flange portion 120 and screwing the formers into the respective internal threads 112 (FIG. 10) formed in the front end surface of the spindle 102. In this state, the center axis 116a of the tool support member 116 coincides with the center axis 102a of the spindle 102 (FIGS. 8 and 9). When removing the mounting members (or bolts) 56 from the corresponding internal threads 112, the tool support member 116 can be detached from the spindle 102.

As shown in FIGS. 11A and 12, the tool clamp member 54 includes a plurality of movable clamping elements 64 (a general term representing movable clamping elements 64A of the tool clamp member 54A and movable clamping elements 64B of the tool clamp member 54B) contained in the member-through-hole 118 of the tool support member 116 so as to be displaceable in a radial direction, and an actuating element 66 (a general term representing an actuating element 66A of the tool clamp member 54A and an actuating element 66B of the tool clamp member 54B) contained in the member-through-hole 118 of the tool support member 116 so as to be displaceable in an axial direction, the actuating element 66 acting to displace the movable clamping elements 64 in the radial direction by the axial displacement of the actuating element. In this configuration, as described later, it is possible to reliably retain the tool holder 14 in the receiving recess 114 of the tool support member 116 by a relatively simple and easy-to-handle structure.

The actuating element 66 is disposed relative to the tool support member 116 with the center axis 66a of the actuating element 66 coinciding with the center axis 116a of the tool support member 116, and in this state, is contained together with the movable clamping elements 64 in the member-through-hole 118. The actuating element 66 is driven by a drive mechanism (e.g., a hydraulic cylinder mechanism) 68 (FIG. 1) provided externally to the spindle head device 100, and acts to displace the movable clamping elements 64 between a shank releasing position and a shank clamping position due to the axial displacement of the actuating element 66 in the member-through-hole 118. It should be noted that the configuration of the tool clamp member 54 of the tool retaining mechanism 104 (including a tool-shank clamping/releasing operation) is similar to the configuration of the tool clamp member 54 of the tool retaining mechanism 16 in the above-described spindle head device 10.

As shown in FIGS. 11A and 12, the tool retaining mechanism 104 further includes a biasing member 82 contained in the rear portion 118a (FIG. 3) of the member-through-hole 118 of the tool support member 116 and elastically biasing the tool clamp member 54 from the inoperative position to the operative position, and a locking member 124 fixedly disposed relative to the tool support member 116 and preventing the biasing member 82 from separating from the member-through-hole 118. In this configuration, as described later, the tool retaining mechanism 104 including the biasing member 82 can be readily replaced, and even when the tool retaining mechanism 104 is detached from the spindle 102, the biasing member 82 can be prevented from separating from the member-through-hole 118.

The illustrated biasing member 82 is constituted, by way of example, from a plurality of coned-disc springs stacked in the axial direction and disposed to surround the actuating element 66 of the tool clamp member 54. The stack of the coned-disc springs 82 is supported at the axial front end (a left end, in the drawing) thereof on a shoulder surface between the rear portion 118a and the intermediate portion 118c of the member-through-hole 118 and at the axial rear end (a right end, in the drawing) thereof on a spring seat 86 attached to the axial rear end region of the actuating element 66, and is held in the rear portion 118a of the member-through-hole 118 by a nut 88 secured to the axial rear end of the actuating element 66.

As illustrated, the spring seat 86 attached to the actuating element 66 has an outer diameter approximate to an inner diameter of the rear portion 118a of the member-through-hole 118, and the nut 88 secured to the actuating element 66 has an outer diameter smaller than the outer diameter of the spring seat 86. The locking member 124 is a tubular member fixed adjacent to the rear end opening of the member-through-hole 118, and is provided with a center opening 124a having a diameter slightly larger than the outer diameter of the nut 88 secured to the actuating element 66 and smaller than the outer diameter of the spring seat 86 attached to the actuating element 66. Thus, the locking member 124 permits the axial displacement of the actuating element 66 and nut 88, caused by the driving operation of the drive mechanism 68 (FIG. 1), in a state where the tool retaining mechanism 104 is properly incorporated in the spindle 102, whereas the locking member 124 engages with the spring seat 86 so as to prevent the biasing member 82 from separating from the member-through-hole 118, in a state where the tool retaining mechanism 104 is detached from the spindle 102.

It should be noted that, when the tool holder 14 is not retained by the tool retaining mechanism 104, the locking member 124 also functions to prevent the unintended rearward movement of the actuating element 66. In this connection, as shown in FIG. 11A, it is preferable that lateral holes 86a, 116b are formed respectively in the spring seat 86 and the tool support member 116, into which holding pins (not shown) are respectively inserted for temporarily holding the biasing member 82 in the member-through-hole 118, until the locking member 124 is attached to the rear end of the member-through-hole 118 in the assembling process of the tool retaining mechanism 104. Further, in place of the tubular locking member 124 (FIG. 11A), a cap-like locking member 124' (FIG. 11B) adapted to be secured to the spindle 102 may be employed. The cap-like locking member 124' is provided with a center opening 124a' similar to the center opening 124a of the tubular locking member 124.

The tool retaining mechanism 104 includes, in a mutually interchangeable manner, a first unit 106 (FIG. 11) including the first tool support member 116A provided with the receiving recess 114A for the first tool holder 14A and the first tool clamp member 54A carrying out a first displacement motion between the operative position and the inoperative position (i.e., the axial displacement of the actuating element 66A and the radial rocking displacement of the movable clamping elements 64A), and a second unit 108 (FIG. 12) including the second tool support member 116B provided with the receiving recess 114B for the second tool holder 14B, different in shape from the receiving recess 114A, and the second tool clamp member 54B carrying out a second displacement motion, different from the first displacement motion, between the operative position and the inoperative position (i.e., the axial displacement of the actuating element 66B and the radial parallel-translation displacement of the movable clamping elements 64B). The first unit 106 and the second unit 108 are handled and stored in a state where the respective tool support members 116A, 116B and the respective tool clamp members 54A, 54B are combined with each other as described.

Each of the first unit 106 and the second unit 108 is mounted to the spindle 102 in such a manner that the tool support member 116A, 116B containing the tool clamp member 54A, 54B and the biasing member 82 in the member-through-hole 118A, 118B is inserted through the front end opening of the spindle-through-hole 110 into the spindle-through-hole 110. Further, as described, the tool support member 116 is fixed to the spindle 102 in such a manner that, in a state where the tool support member 116 is properly contained in the spindle-through-hole 110, the mounting members (or bolts) 56 are individually screwed into the internal threads 112 (FIG. 10) in the front end surface of the spindle 102. Thereby, the mounting of the first unit 106 or the second unit 108 to the spindle 102 is completed.

In a state where the first unit 106 or the second unit 108 is properly mounted to the spindle 102, the tool support member 116 and the tool clamp member 54 (the movable clamping element 64 and the actuating element 66) are disposed coaxially with respect to the spindle 102, and during the axial displacement of the actuating element 66 in the member-through-hole 118, the tool support member 116 is held in the spindle-through-hole 110 in a stationary manner. In order to perform the interchange of the first unit 106 and the second unit 108, it is only required to take out the mounting members (or bolts) 56 from the corresponding internal threads 112, and detach the tool support member 116 containing the tool clamp member 54 from the spindle 102.

According to the spindle head device 100 having above-described configuration, it is possible to achieve several effects equivalent to those achieved by the spindle head device 10. More specifically, in the case where several types of tool holders 14 with shanks 46 mutually different in terms of mechanical structures are intended to be used, it is possible to mount, for use, the tool support members 116 provided with the receiving recesses 114 corresponding respectively to the tool holders 14 and the tool clamp members 54 having clamping functions corresponding respectively to the tool holders 14, to the spindle 102 by the mounting member 56, as occasion demands. As a result, it is possible to stably retain the different-type tool holders 14 in an interchangeable manner on the common spindle 102 by the tool retaining mechanisms 104 corresponding respectively to the tool holders 14. For example, it is possible to use various tools attached to the tool holders complying with JIS and the tool holders complying with DIN, in the single machine tool by changing the mechanical configuration of the tool retaining mechanism 104. Therefore, according to the spindle head device 100, it is possible to prevent equipment cost from increasing and maintenance and management from becoming complicated.

In the spindle head device 100, irrespective of the type of the tool holder 14, the shank 46 thereof is not directly retained on the spindle 102, but is retained in the receiving recess 114 of the tool support member 116 detachably mounted to the spindle 102. Thus, if the receiving recess 114 has been worn by repeated tool-changing works, it is only required to replace the tool support member 116 with new one without replacing or renewing the relatively expensive spindle 102. Therefore, according to the spindle head device 100, even if the tool-changing works are highly frequently performed, the spindle 102 needs not be replaced or renewed, and it is thus possible to prevent maintenance cost from increasing.

In particular, in the spindle head device 100, the tool retaining mechanism 104 includes, in a mutually interchangeable manner, the first unit 106 and the second unit 108 respectively including the tool support members 116A, 116B and the tool clamp members 54A, 54B, so that it is possible to handle each unit 106, 108 in a state where the tool support member 116A, 116B is combined with the tool clamp member 54A, 54B, and thereby to extremely ease the changing work of the tool retaining mechanism 104 relative to the spindle 102. In this respect, it is advantageous that, as compared to the spindle head device 10, each unit 106, 108 is configured such that the tool support member 116A, 116B contains both the tool clamp member 54A, 54B and the biasing member 82, and thus the exchanging work of the tool retaining mechanism 104 relative to the spindle 102 is further simplified. On the other hand, the units 106, 108 individually contain the biasing members 82, and therefore, the unit configuration of the spindle device 10, in which the biasing member 82 can be commonly used, has an advantage in terms of cost. Further, the configuration of the spindle head device 10 provides another advantage in downsizing the tool support member 52.

In the above-described spindle head device 100, as shown in FIGS. 11A and 12, the tool support member 116A, 116B may also be provided with a fluid passage 126 for supplying a cleaning fluid or a cooling fluid to the tool holder 14A, 14B. In this case, the fluid may also be supplied through a second fluid passage 96 formed in the actuating element 66A, 66B of the tool clamp member 54A, 54B to the fluid passage 126 of the tool support member 116A, 116B. In this configuration, it is not necessary to form a fluid passage in the spindle 102, so that manufacturing cost of the spindle 102 can be reduced.

Figure 13A:
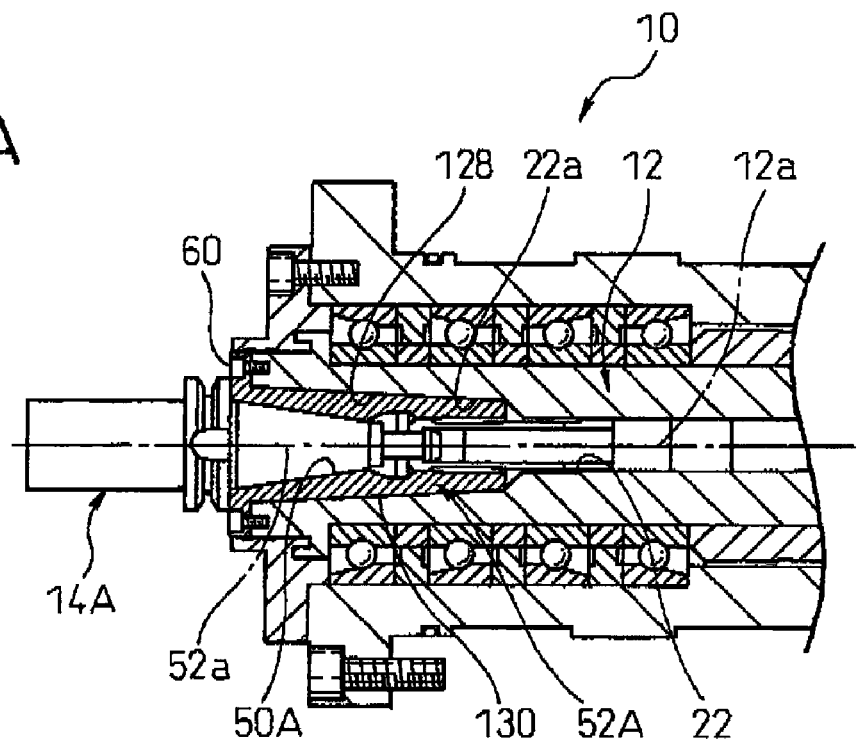
FIGS. 13A and 13B are sectional views showing a modification of the spindle head device of FIG. 1, and respectively showing a state where the first tool holder is retained and a state where the second tool holder is retained.
Figure 13B:
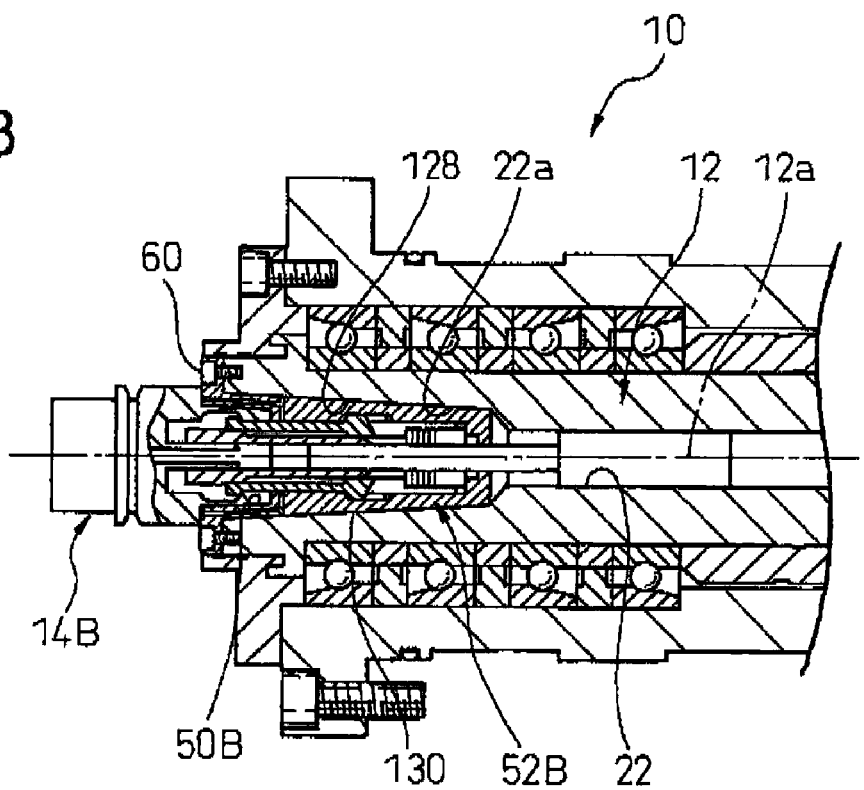

FIGS. 13A to 14B respectively show the modifications of the spindle head devices 10, 100 according to the first and second embodiments. As shown in FIGS. 13A and 13B, in the spindle head device 10 according to the first embodiment, the spindle 12 may be provided, in a region (i.e., the front portion 22a) adjacent to the axial front end (a left end, in the drawing) of the spindle-through-hole 22, with a fitting surface 128 having a tapered shape with a diameter thereof increasing toward the front end opening about the center axis 12a. In this case, the tool support member 52A (FIG. 13A), 52B (FIG. 13B) is provided with an outer surface 130 with a diameter thereof increasing in a tapering rate identical to the tapering rate of the fitting surface 128 toward the flange portion 60. In this configuration, when the tool support member 52 is contained in the front portion 22a of the spindle-through-hole 22 of the spindle 12, it is possible to easily make the center axes 12a, 52a coincide with each other, and thus to support the tool support member 52 on the spindle 12 in a centering manner.

Figure 14A:
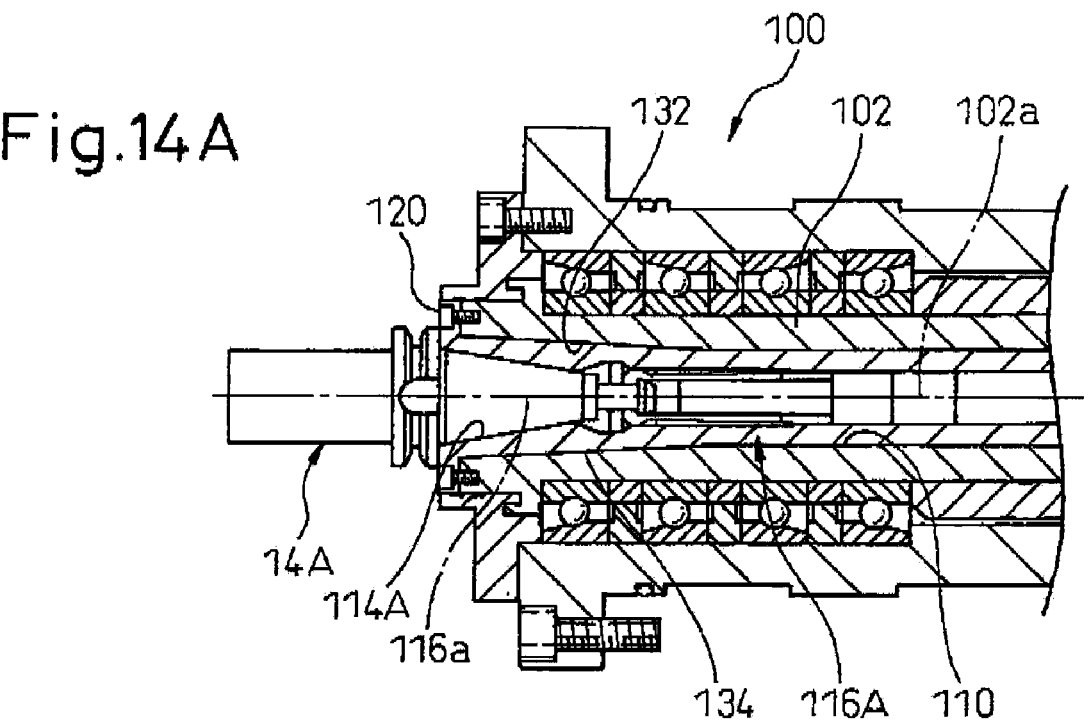
FIGS. 14A and 14B are sectional views showing a modification of the spindle head device of FIG. 8, and respectively showing a state where the first tool holder is retained and a state where the second tool holder is retained.
Figure 14B:
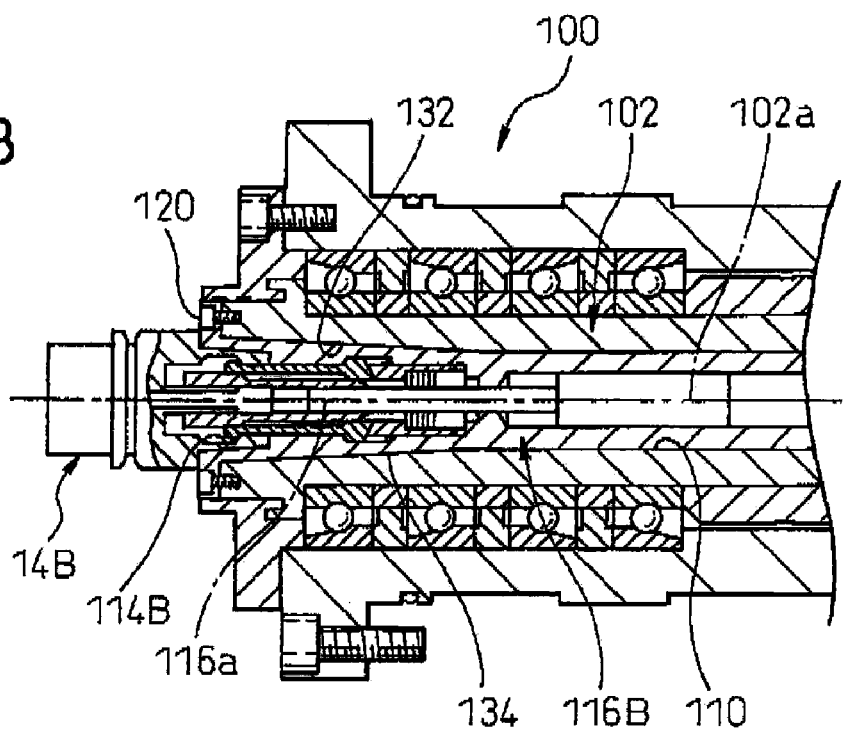

Similarly, as shown in FIGS. 14A and 14B, in the spindle head device 100 according to the second embodiment, the spindle 102 may be provided, in a region adjacent to the axial front end (a left end, in the drawing) of the spindle-through-hole 110, with a fitting surface 132 having tapered shape with a diameter thereof increasing toward the front end opening. In this case, the tool support member 116A (FIG. 14A), 116B (FIG. 14B) is provided, in the axial front end region, with an outer surface 134 with a diameter thereof increasing in a tapering rate identical to the tapering rate of the fitting surface 132 toward the flange portion 120. In this configuration, when the tool support member 116 is contained in the spindle-through-hole 110 of the spindle 102, it is possible to easily make the center axes 102a, 116a coincide with each other, and thus to support the tool support member 116 on the spindle 102 in a centering manner.

Figure 15:
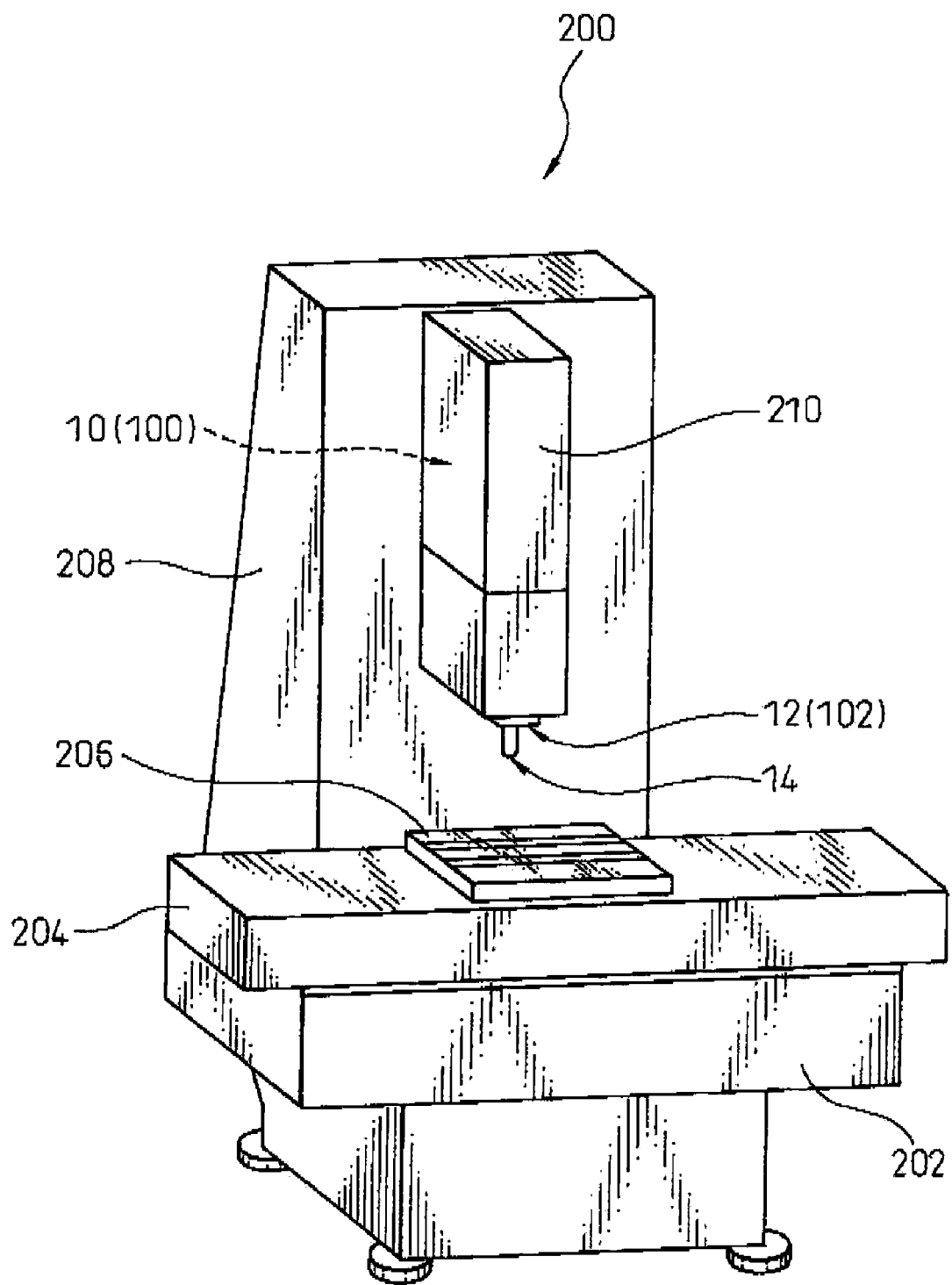
FIG. 15 is an illustration showing a machine tool according to an embodiment of the present invention, and capable of installing the spindle head device of FIG. 1 or FIG. 8.

FIG. 15 shows a machine tool 200 according to an embodiment of the present invention, which can be equipped with the spindle head device 10, 100 having the above-described configuration. The machine tool 200 has, by way of example, a configuration of a vertical machining center, and includes a bed 202, a table 204 mounted on the bed 202 in a horizontally movable manner, a workpiece pallet 206 mounted on the table 204, a column 208 uprightly standing on the bed 202 at the lateral side of the table 204, and a slide 210 mounted on the front surface of the column 208 in a vertically movable manner, wherein the spindle head device 10, 100 according to the first or second embodiment is installed in the slide 210. The machine tool 200 further includes a not-shown automatic tool changer (ATC), so that a tool holder 14 supporting a tool is detachably attached to the spindle 12, 102 of the spindle head device 10, 100 by the ATC.

The machine tool 200 including the spindle head device 10, 100 capable of stably retaining, in an interchangeable manner, several types of tool holders 14 with shanks 46 mutually different in terms of mechanical structures on the common spindle 12, 102 by the corresponding tool retaining mechanism 16, 104 (FIG. 1, FIG. 8), as already described, it is possible to prevent equipment cost from increasing and maintenance and management from becoming complicated. Also, in the machine tool 200, even if the receiving recess 50, 114 (FIG. 1, FIG. 8) of the spindle head device 10, 100, receiving and retaining the shank 46 of the tool holder 14, is worn, the spindle 12, 102 needs not be replaced or renewed, and it is thus possible to prevent maintenance cost from increasing.

As will be apparent from the above description, according to the present invention, in the case where several types of tool holders with shanks mutually different in terms of mechanical structures are intended to be used in the spindle head device, it is possible to mount, for use, the tool support members provided with the receiving recesses corresponding respectively to the tool holders and the tool clamp members having clamping functions corresponding respectively to the tool holders, to the spindle by the mounting member, as occasion demands. As a result, it is possible to stably retain the different-type tool holders in an interchangeable manner on the common spindle by the tool retaining mechanisms corresponding respectively to the tool holders, and thereby it is possible to prevent equipment cost from increasing and maintenance and management from becoming complicated. Moreover, if the receiving recess has been worn by repeated tool-changing works, it is only required to replace the tool support member with new one without replacing or renewing the relatively expensive spindle, so that even if the tool-changing works are highly frequently performed, it is possible to prevent maintenance cost from increasing.

While the present invention has been described above in connection with the preferred embodiments thereof, it will be understood by those skilled in the art that various changes and modifications may be made without departing from the disclosure of the appended claims.

The invention claimed is:

1. A spindle head device for a machine tool comprising:
a spindle; and
a tool retaining mechanism detachably retaining a tool holder on said spindle;
said tool retaining mechanism comprising:
a tool support member provided with a receiving recess detachably receiving a shank of a tool holder;
a tool clamp member disposed to be displaceable with respect to said tool support member between an operative position and an inoperative position, said tool clamp member, at said operative position, clamping the shank of the tool holder and fixedly holding the shank in said receiving recess of said tool support member, and at said inoperative position, releasing the shank and allowing the tool holder to be attached and detached to and from said receiving recess; and
a mounting member detachably mounting said tool support member and said tool clamp member to said spindle
wherein said spindle is provided with a spindle-through-hole penetrating in an axial direction;
wherein said tool support member is provided with a member-through-hole penetrating in an axial direction and communicating with said receiving recess, and is dimensioned so as to be contained in said spindle-through-hole of said spindle over an entire axial length of said spindle-through-hole; and
wherein said tool clamp member comprises a movable clamping element contained in said member-through-hole of said tool support member to be displaceable in a radial direction, and an actuating element contained in said member-through-hole of said tool support member to be displaceable in an axial direction, said actuating element displacing said movable clamping element in the radial direction by an axial displacement of said actuating element.

2. A spindle head device for a machine tool, as set forth in claim 1, wherein said tool retaining mechanism further comprises a biasing member contained in said member-through-hole of said tool support member and elastically biasing said tool clamp member from said inoperative position to said operative position, and a locking member fixedly disposed relative to said tool support member and preventing said biasing member from separating from said member-through-hole.

3. A spindle head device for a machine tool, as set forth in claim 1, wherein said spindle is provided, in a region adjacent to one axial end of said spindle-through-hole, with a fitting surface having a tapered shape with a diameter thereof increasing toward said one axial end, said fitting surface acting to support in a centering manner said tool support member.

4. A spindle head device for a machine tool, as set forth in claim 1, wherein said tool support member is provided with a fluid passage for supplying a cleaning fluid or a cooling fluid to a tool holder.

5. A spindle head device for a machine tool, as set forth in claim 1, wherein said tool retaining mechanism comprises, in a mutually interchangeable manner:
a first unit including a first one of said tool support member provided with a first one of said receiving recess and a first one of said tool clamp member carrying out a first displacement motion between said operative position and said inoperative position; and
a second unit including a second one of said tool support member provided with a second one of said receiving recess, different in shape from said first one of receiving recess, and a second one of said tool clamp member carrying out a second displacement motion, different from said first displacement motion, between said operative position and said inoperative position.

6. A machine tool comprising a spindle head device as set forth in claim 1.

* * * * *